(12) United States Patent
Lungenschmied et al.

(10) Patent No.: US 12,339,164 B2
(45) Date of Patent: Jun. 24, 2025

(54) COMMUNICATION SYSTEM, MONITORING SYSTEM AND RELATED METHODS

(71) Applicant: TRINAMIX GMBH, Ludwigshafen am Rhein (DE)

(72) Inventors: Christoph Lungenschmied, Vienna (AT); Felix Schmidt, Ludwigshafen (DE); Robert Lovrincic, Ludwigshafen (DE); Michel Valentin Kettner, Ludwigshafen (DE); Daniel Kaelblein, Ludwigshafen (DE); Jochen Brill, Ludwigshafen (DE); Thomas Rosenkranz, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 216 days.

(21) Appl. No.: 17/906,383

(22) PCT Filed: Mar. 17, 2021

(86) PCT No.: PCT/EP2021/056792
§ 371 (c)(1),
(2) Date: Sep. 15, 2022

(87) PCT Pub. No.: WO2021/185892
PCT Pub. Date: Sep. 23, 2021

(65) Prior Publication Data
US 2023/0140236 A1 May 4, 2023

(30) Foreign Application Priority Data
Mar. 18, 2020 (EP) ..................... 20163881

(51) Int. Cl.
*G01J 3/02* (2006.01)
*G01N 21/27* (2006.01)

(52) U.S. Cl.
CPC .......... *G01J 3/0264* (2013.01); *G01N 21/274* (2013.01)

(58) Field of Classification Search
CPC .... G01N 21/274; G01N 21/31; G01N 21/359; G01N 2201/127; G01J 3/0264; G01J 3/28; H04L 67/10; G05B 19/41875
(Continued)

(56) References Cited

U.S. PATENT DOCUMENTS

| 2005/0010090 A1* | 1/2005 | Acosta ................. A61B 5/1495 |
| | | 600/316 |
| 2005/0029457 A1* | 2/2005 | Long .................... G01N 21/274 |
| | | 250/339.08 |

(Continued)

FOREIGN PATENT DOCUMENTS

| JP | 2020016505 A | 1/2020 |
| WO | 2017002079 A1 | 1/2017 |

(Continued)

OTHER PUBLICATIONS serverfault.com, cloud computing—Multiple servers vs 1 big server performance (6 pages) (Year: 2010).*

(Continued)

*Primary Examiner* — Wing F Chan
*Assistant Examiner* — Leon Y Tseng
(74) *Attorney, Agent, or Firm* — Armstrong Teasdale LLP

(57) ABSTRACT

Described herein is a communication system including a cloud server, a first server, and at least one second server. The first server includes a first communication interface configured to provide reference spectral information referring to at least one reference sample and reference analytical data to the cloud server. Each second server includes a second communication interface configured to provide spectral information related to at least one substance to the cloud (Continued)

server. The cloud server is configured to: generate a calibration model, where the calibration model comprises at least one parameter; apply the calibration model to the spectral information, whereby at least one value for the at least one parameter is extracted; and provide the at least one value for the at least one parameter to the first server. The first server is further configured to determine treatment data using the at least one value for the at least one parameter.

19 Claims, 4 Drawing Sheets

(58) Field of Classification Search
USPC .......................................... 250/252.1; 709/203
See application file for complete search history.

(56) References Cited

U.S. PATENT DOCUMENTS

| | | | |
|---|---|---|---|
| 2011/0264411 A1* | 10/2011 | Yang | G01N 21/55 702/190 |
| 2019/0353587 A1 | 11/2019 | O'Brien et al. | |
| 2020/0148552 A1* | 5/2020 | Yizhack | C02F 1/008 |
| 2021/0255105 A1 | 8/2021 | Gilmore | |
| 2024/0255349 A1 | 8/2024 | Goldring et al. | |

FOREIGN PATENT DOCUMENTS

| | | |
|---|---|---|
| WO | 2018044972 A1 | 3/2018 |
| WO | 2018090142 A1 | 5/2018 |
| WO | 2018122857 A1 | 7/2018 |
| WO | 2019115595 A1 | 6/2019 |
| WO | 2019115596 A1 | 6/2019 |
| WO | 2019115594 A2 | 8/2019 |
| WO | 2020014073 A1 | 1/2020 |
| WO | 2021110721 A1 | 6/2021 |

OTHER PUBLICATIONS

International Search Report and Written Opinion for PCT/EP2021/056792 issued on Jun. 10, 2021, 8 pages.
R. F. Stier, The Measurement of Frying Oil Quality and Authenticity, Chapter 8 from Frying: Improving Quality, Ed. J. B. Rossell, Woodhead Publishing Limited, Cambridge (UK), 2001.
German standard methods for the analysis of fats and other lipids, Wissenschaftliche Verlagsgesellschaft, Stuttgart, Germany, 1998.
R.F. Stier, Tests to monitor quality of deep-frying fats and oils, Eur. J. Lipid Sci. Technol. 106 (2004) 766-771.
Q. Zhang et al., Chemistry and Physics of Lipids 165 (2012) 662-681.
Schwarz, Quick tests used for fats and oils, Eur. J. Lipid Sci. Technol. 102 (2000) 542.
Buening-Pfaue and Kehraus, Application of near infrared spectroscopy (NIRS) to the analysis of frying fats, Eur. J. Lipid Sci. Technol. 102 (2000) 580.
Wang et al., Anal. Methods 6, p. 7628, 2014.
John T. Simpson et al. Rep. Prog. Phys. 78, 086501, 2015.

* cited by examiner

COMMUNICATION SYSTEM, MONITORING SYSTEM AND RELATED METHODS

CROSS-REFERENCE TO RELATED APPLICATIONS

This application is a U.S. National Phase Application of PCT/EP2021/056792, filed Mar. 17, 2021, which claims the benefit of priority to European Patent Application No. 20163881.4, filed Mar. 18, 2020, the entire contents of which are hereby incorporated by reference herein.

DESCRIPTION

Field of the Invention

The invention relates to a communication system, to a monitoring system for in-situ monitoring of at least one substance, wherein the monitoring system comprises the communication system, as well as to related methods. The monitoring system can, via the communication system, be used for the monitoring of the at least one substance and for providing treatment data for treating the at least one substance. The monitoring system can be used for various applications, such as food or beverage control or monitoring, industrial process control, material classification or characterization, product anti-counterfeiting, characterization of living matter, or a health application.

Prior Art

Deep-frying is a widely used method of preparing food. In the food service industry, frying oil characterization provides necessary information for optimal oil management. In high-efficiency restaurants and other businesses specialized on deep-fried dishes, proper oil management not only has a direct impact on customer satisfaction, but also on the balance sheet. It helps to ensure consistent quality of the fried food as well as getting the most uses from any oil batch. Two of the most important functions of frying oil management are maintaining an oil composition that yields the desired food characteristics and deciding when to replace the oil.

Based on these considerations, various tests have been developed in order to characterize a status of frying oil. Such kinds of test are described in the literature, such as in R. F. Stier, *The Measurement of Frying Oil Quality and Authenticity*, Chapter 8 from *Frying: Improving Quality*, Ed. J. B. Rossell, Woodhead Publishing Limited, Cambridge (UK), 2001, or have been defined by organizations such as the "Deutsche Gesellschaft für Fettwissenschaften" in *German standard methods for the analysis of fats and other lipids*, Wissenschaftliche Verlagsgesellschaft, Stuttgart, Germany, 1998.

However, many of these established standard methods are time-consuming and laborious. Their execution requires a well-equipped laboratory and skilled staff, such that they are unsuitable for daily operations in restaurants. Rather, the food service industry would require tests which are easier to use, yield faster results and are safe during operation.

R. F. Stier, *Tests to monitor quality of deep-frying fats and oils*, Eur. J. Lipid Sci. Technol. 106 (2004) 766-771, has classified available quick tests as follows:
A. Physical methods:
  1. Visual inspection:
    a. Foam formation and foam height;
    b. Oil color and clarity determination;
  2. Viscosity testing, based on an observation that a viscosity of oil increases as the oil polymerizes under the influence of heat and oxygen;
  3. Dielectric measurements, wherein a change in dielectric constant is monitored;
  4. Artificial noses; and
  5. Near Infrared spectroscopy;
B. Chemical methods: Quick tests using test strips or chemical test kits.

According to R. F. Stier, neither the foam formation nor the oil color is a good indicator of whether the oil has to be replaced or not, wherein oils that may reach the color of the wand are considered unfit for use and should be discarded. However, these tests have no relationship to actual oil quality and are subjective since good oil can be dark and bad oil can be light in color.

Further, oil viscosity measurements, which can be used for indicating a polymerization grade of the oil, do not refer to other degradation mechanisms. However, these mechanisms lead to various degradation products which, according to Q. Zhang et al., Chemistry and Physics of Lipids 165 (2012) 662-681, include volatile compounds, hydrolysis products, oxidized triacylglycerol monomers, cyclic compounds, trans configuration compounds, polymers, sterol derivatives, nitrogen- and sulfur-containing heterocyclic compounds, and acrylamide.

Instruments which are designated for measuring changes in a dielectric constant in the oil are known, such as Ebro FOM 330 and Testo 270. Whereas Schwarz, *Quick tests used for fats and oils*, Eur. J. Lipid Sci. Technol. 102 (2000) 542 affirms a value of instruments based on this method in a comparative study with other rapid test methods, R. F. Stier, see above, sets forth that in order to overcome problems the manufacturer suggests that the instrument be "zeroed" with fresh oil and that the sensor cup be heated to 50° C. when solid fats are used for frying. Filtration may also be employed to remove suspended solids and entrained water, which will adversely affect the readings. As a matter of fact, dielectric measurements are currently only used in restaurants for occasional oil testing.

Further according to R. F. Stier, see above, although the potential of artificial noses appears to be high, they are not technically mature. No products for oil management based on this technology are currently available for commercial use.

Therefore, chemical tests are, typically, used in restaurants. However, they require an unsafe and undesirable procedure comprising a sampling of hot frying oil. For this purpose, test strips are available commercially. They can be sensitive to free fatty acids in the oil, such as the "oil quality test strips" provided by 3M. According to the manual, storage of the test strips may, however, prove to be a challenge for restaurants since they are supposed to be stored in a tightly sealed container at low temperature, ideally in a fridge or freezer.

Further, R. F. Stier, see above, assigns a high potential to near infrared (NIR) spectroscopy in the characterization of frying oil. Accordingly, test systems that utilize near and mid infrared are used throughout the food industry. These units may be used on-line or at-line. Herein, NIR measurements may be obtained through reflectance or transmittance, i.e., the light is reflected off or passed through the product to where it is collected by the detector. NIR may be used to quantitate moisture, protein, fat and solids". Buening-Pfaue and Kehraus, *Application of near infrared spectroscopy (NIRS) to the analysis of frying fats*, Eur. J. Lipid Sci. Technol. 102 (2000) 580 report on their studies using NIR to evaluate frying fats, wherein a good correlation between NIR and traditional analytical methods has been found, thus, indicating that this instrument could be used for edible oils analysis.

Despite its huge potential, NIR spectroscopy has not been widely adopted for frying oil characterization outside of research laboratories. Proliferation has been hampered by high equipment prices, a bulkiness of the systems, expense and technical challenges related to using optical probes submerged in hot oil, and an elaborate translation from spectral data to parameters necessary for decision-making in oil management.

Currently available oil management systems provide closed-loop oil systems for automatic oil filling and emptying as well as oil disposal. These systems include software solutions to support both data management and record keeping with respect to oil usage in restaurants. However, characterization of the oil by any kind of method is not part of these systems.

WO 2017/002079 A1 discloses a device and a method for real-time measurement of the quality of frying oil by sensing a chemical species related to the quality of the frying oil. The device comprises an optical sensor comprising at least a light source and at least a light detector; a chamber for receiving the frying oil to be measured arranged such that the light source is optically coupled through the frying oil in the chamber to the light detector; and a processing unit configured to: receive from the light detector a signal of the frying oil absorption, transmittance, reflection, scattering, or combinations thereof, of light emitted by the light source; calculate, from the received signal, an output indicative of the quality of the frying oil using a precalculated model relating chemical species and quality of the frying oil.

WO 2018/044972 A1 discloses an analysis system for liquid sample analysis using NIR spectroscopy and spectra processing in order to deliver a composition of a liquid sample. In the context of oil management, however, this information is of little use for the typical user who has no expertise in sophisticated chemical processes of oil degradation and, hence, cannot derive any required actions from the chemical composition.

WO 2018/090142 A1 discloses a method of spectrophotometric analysis. There is provided a measuring system including a low-resolution spectrophotometric sensor, a device of mobile communication (such as smartphone or tablet) and software which may be installed partially on that device and partially on a remote computing server or service. The method includes calibration of a measurement channel, oriented on measuring optical spectra or spectrum-related quantities; estimation of the optical spectrum of an arbitrary, analyzed sample, on the basis of the data from the sensor and the results of calibration; and evaluation of a spectrum-related quantity on the basis of the results of estimation. These steps may include involvement of local and/or remote computing resources.

WO 2018/122857 A1 discloses a method for monitoring, analysis and maintenance of water and equipment in swimming pools, said method implemented by one or more processors operatively coupled to a non-transitory computer readable storage device, on which are stored modules of instruction code that when executed cause the one or more processors to perform: accumulating and monitoring data from elements including at least one of: sensors, actuators, and breakers in and around the vicinity of the swimming pools; accumulating non-sensory data from a plurality of sources at a local processing unit; propagating said data to an online remote server; applying machine learning or rule based algorithms at the online remote server configured to incorporate all the acquired data and obtain an optimal policy for pool maintenance by providing recommendations, control parameters; and providing an online interface to access said recommendation/control parameters for at least one of pool owners, pool servicemen, pool maintenance companies, pool vendors and pool retail dealers.

US 2019/353587 A1 discloses a method and an apparatus for field spectroscopic characterization of seafood. A portable NIR spectrometer is connected to an analyzer configured for performing a multivariate analysis of reflection spectra to determine qualitatively the true identities or quantitatively the freshness of seafood samples.

WO 2020/014073 A1 discloses evaluating a characteristic of edible oil using a spectrometer. Optical reflectance data are obtained from edible oil in situ in a frying apparatus housing the edible oil, the reflectance data corresponding to a specified range of infrared wavelengths. A model profile corresponding to the characteristic being assessed is obtained from a repository housing a secured library of such profiles. The model profile defines a regression vector for use in transforming the reflectance data to generate a value corresponding to the characteristic being assessed. A criterion is applied to the value to establish a simplified representation of the characteristic for presentation to a user for assessment of oil quality.

Problem Addressed by the Invention

Therefore, a problem addressed by the present invention is that of specifying a communication system, a monitoring system for in-situ monitoring of at least one substance, and related methods, which at least substantially avoid the disadvantages of known systems, devices, and methods of this type.

In particular, it would be desirable that the systems and related methods provide an efficient monitoring of the at least one substance, which may comprise a liquid or not, wherein the at least one substance can be placed at any location, even in a remote or hardly accessible area, at premises of a user, wherein a processing of measurement data acquired at or near the location of the at least one substance is distributed between a first instance which is familiar with an evaluation of measurement data, and a second instance which is familiar with providing treatment data to the user based on the evaluated measurement data, whereby the systems and related methods are capable of concurrently applying distributed best practice and a specific exchange of data under high data protection standards during the processing of the measurement data by employing a, preferably fully, automatic procedure.

Especially with regard to the monitoring of a deep-frying process, it would be desirable that the systems and related methods can ensure high quality standards for fried food by characterizing frying oil under in-situ conditions for deep-frying operations, in particular by efficient oil characterization capable of yielding parameters that can be reasonably correlated to the food quality. According to R. F. Stier, see above, an ideal quick test meets the following criteria:

it correlates with official and/or generally recognized analytical methods;
it is easy to use;
it is safe for use in food preparation in production areas;
it correlates to food quality and safety;
it is field rugged;
it allows for re-inspection; and
it is green or environmentally friendly.

In general, it would be desirable to be able to meet similar catalogues of criteria applicable to other kinds of substances, whether comprising a liquid or not, in various applications, such as food or beverage control or monitoring, industrial process control, material classification or characterization, product anti-counterfeiting, characterization of living matter, or a health application.

SUMMARY OF THE INVENTION

This problem is solved by the invention with the features of the independent patent claims. Advantageous developments of the invention, which can be implemented individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a communication system is disclosed. Accordingly, the communication system comprises a cloud server, a first server, at least one second server, and at least one third server;
  wherein the first server further has a first communication interface configured to provide reference spectral information referring to at least one reference sample and reference analytical data to the cloud server;
  wherein each second server has a second communication interface configured to provide spectral information related to at least one substance to the cloud server;
  wherein the cloud server is configured to
    generate a calibration model by using the reference spectral information referring to the at least one reference sample and the reference analytical data provided by the first server, wherein the calibration model comprises at least one parameter;
    apply the calibration model to the spectral information related to the at least one substance provided by the second server, whereby at least one value for the at least one parameter is extracted;
    provide the at least one value for the at least one parameter to the first server via the first communication interface;
  wherein the first server is further configured to determine treatment data by using the at least one value for the at least one parameter provided by the cloud server, wherein the treatment data comprise at least one piece of data which is related to a proposed treatment of the at least one substance;
  wherein the first server further has at least one third communication interface, wherein each third communication interface is configured to provide the treatment data to the at least one third server.

As used herein, the term "communication" refers to a transmission of a piece of data from a first server to a second server, or vice versa, via at least one communication interface. Herein, the term "data" relates to piece of information that is provided in a digital or digitized form, such as numerical or alphanumerical code. As generally used, the term "information" refers to any kind of data which comprises a content that may be useful for a user. By way of example, the information may be or comprise "spectral information" which are related to at least one piece of data related to an electromagnetic spectrum, herein also denoted as "spectrum", such a single intensity at a particular wavelength, frequency, or photon energy, or a plurality of intensities distributed over a selected range of wavelengths, frequencies, or photon energies. Thus, the spectral information which comprises spectroscopic data can, preferably, be generated in accordance with a further aspect of the present invention by using an optical spectrometer as described below in more detail. In addition, the spectral information may comprise metadata, wherein the term "metadata" refers to at least one item of information which accompanies the information related to the electromagnetic spectrum as described above, in particular at least one of a date, a time, a location or at least one circumstance, such as temperature or atmospheric conditions, temperature of the spectrometer, temperature of the at least one substance, spectrometer identification data, batch of the at least one substance, manufacturer of the at least one substance, user, photographs, satellite data, being related to the spectral information or an acquisition thereof. Thus, the term "providing information" relates to a process by which a particular piece of information is transmitted in form of a piece of data from the first server to the second server, or vice versa, via the at least one communication interface.

Further, the term "system" refers to a device comprising at least two components, wherein at least two of the components are individual components, while two or more of the components may be integrated into one component, wherein the components are configured to perform a joint task, such as handling a type of communication or a kind of monitoring. In particular, the term "communication system" refers, as generally used, to a system which at least comprises a first server, a second server, and a communication interface configured to transmit a piece of data between the servers. As described below in more detail, the communication system according to the present invention comprises a cloud server, a first server, at least one second server, at least one third server, and various communication interfaces. As further generally used, the term "communication interface" refers a transmission channel designated for the transmission of the data. Herein, the communication interface may be arranged as a unidirectional interface which is configured for forwarding at least one piece of data into a single direction, either from the first server to the second server, or from the second server to the first server. Alternatively, the communication interface may be arranged as a bidirectional interface which is configured for forwarding at least one piece of data into one of two directions, from the first server to the second server, or vice versa. Thus, a particular bidirectional interface can, as an alternative, be replaced by two individual unidirectional interfaces which are configured for data transmission in opposite direction with respect to each other. For the purpose of data transmission, the communication interface may comprise a wire-bound element or a wireless element. By way of example, the wire-bound element may be selected from at least one of a metal wire, such as a copper wire or a gold wire; a computer bus system, such as a universal serial bus (USB); or an optical fiber, whereas the wireless element may comprise a wireless transmitter or a Bluetooth element. However, further kinds of communication interfaces may also be feasible. As further used herein, the terms "first communication interface", "second communication interface", "third communication interface", and "fourth communication interface" refer to four individual communication interfaces being used for communication between two individually assigned servers.

As further used herein, the term "server" relates to a device which is configured to provide resources to a further device, typically denoted as "client", wherein the "resources", especially, comprise at least one of computing power, such as for running at least one computer program; or data storage capacity, such as for storing at least one piece of data. By way example, a client can run a single computer program or store pieces of data distributed across multiple servers, while a single server can serve multiple clients with regard to at least one of program execution and storage requirement. In contrast to the term "server", which refers to such a device that is arranged within a local network, the term "cloud server" relates to a kind of server that is accessible on demand by the client via internet. As a result, neither a location of the cloud server nor a direct active management of the cloud server is accessible to the client. With regard to the present invention, the terms "first server", "second server", and "third server" refer to three individual servers each arranged within its local network, wherein the second server and the third server may, as described below in more detail, be integrated into a single unit being arranged in a single network, while the term "cloud server" refers to the kind of server that is accessible on demand by the client via internet.

As already indicated above, the term "spectral information" refers to a piece of information that is related to at least one piece of data in relationship to an electromagnetic spectrum. As used herein, the "spectral information" relates to spectral information which refers to a particular sample of unknown content and unknown physical properties, whereas the term "reference spectral information" relates to spectral information which refers to at least one reference sample, wherein the term "reference sample" denotes a sample of known content and known physical properties. As used herein, the term "reference analytical data" refers to at least one piece of data which is related to the known content and known physical properties of the reference sample. According to the present invention, the reference spectral information which refers to at least one reference sample and the reference analytical data are provided to the cloud server by the first server. Further according to the present invention, the spectral information is provided directly or indirectly to the cloud server using the second communication interface. As further used herein, the term "directly" refers to a configuration in which the second communication interface connects the at least one second server with the cloud server in a manner that the spectral information is provided to the cloud server without detour. In contrast hereto, the term "indirectly" refers to a configuration in which the second communication interface connects the at least one second server with a different server, in particular with the first server, to which the spectral information is provided, firstly, wherein the different server, in particular the first server, has a fourth communication interface configured to, subsequently, provide the spectral information from the first server to the cloud server. As described below in more detail, the spectral information can, thus, be subject to a modification which may be performed by the different server, in particular the first server. However, different manners of indirectly providing the spectral information to the cloud server are conceivable.

According to the present invention, the reference spectral information which refers to the at least one reference sample and the reference analytical data is used for generating a calibration model. As generally used, the term "calibration model" refers to a model comprising a correlation of the reference spectral information to the reference analytical data in order to be able to derive analytical data from the spectral information related to a particular sample of unknown content and unknown physical properties by using the model. Herein, a process of correlating the reference spectral information to the reference analytical data is described by the term "generating the calibration model", while the term "applying the calibration model" denotes a further process of deriving the analytical data from the spectral information related to the particular sample of unknown content and unknown physical properties. According to the present invention, this process is performed by the cloud server, for which purpose the cloud server uses the reference spectral information and the reference analytical data as provided to the cloud server by the first server.

Further according to the present invention, the calibration model is implemented by using at least one parameter, typically a set of parameters, for a description of the analytical data. Based on the least one parameter, the calibration model is configured to sufficiently represent the correlation in a reasonable manner, in particular, by resulting in a deviation below a threshold of the correlation of the reference spectral information which refers to the at least one reference sample to the reference analytical data by solely using the at least one parameter. As used herein, the term "parameter" refers to a representation of an influence to analytical data with respect to the particular substance. Particular examples for the parameter are presented below.

Thus, the term "extracting at least one value for the at least one parameter" as used herein refers to a process of determining at least one value for the at least one parameter by using the calibration model for the adjustment of the spectral information as acquired in an actual measurement of a particular sample. As a result thereof, the analytical data of the particular sample are sufficiently described by the at least one parameter. Consequently, the at least one parameter can be used as a kind of synopsis for the content and the physical properties of the particular sample. In general, the amount of data used for the at least one parameter constitutes only a small fraction of the amount of data which are required to describe the related spectrum. According to the present invention, this process is also performed by the cloud server, for which purpose the cloud server uses the spectral information as provided to the cloud server directly or indirectly by the at least one second server and the calibration model as available within the cloud server.

Further according to the present invention, the treatment data are determined by using the at least one value for the at least one parameter. As generally used, the term "value" refers to a logical or a numerical code, depending on a content of the at least one parameter. As used herein, the term "treatment data" refers to at least one piece of data which is related to a proposed treatment of the at least one substance which is monitored, in particular by using the monitoring system as described below in more detail. Thus, the term "determining treatment data" as further used herein refers to a process of generating the at least one piece of data related to the proposed treatment of the at least one substance being monitored by using the at least one value for the at least one parameter. According to the present invention, this process is performed by the first server, for which purpose the first server uses the at least one value for the at least one parameter as provided to the first server by the cloud server via the first communication interface.

Further according to the present invention, the treatment data are provided to the at least one third server by using a specific third communication interface between the first server and each third server. Herein, the treatment data may be stored in a data storage device of the third server or in a separate storage device to which it may be provided via at least one interface, such as a wireless interface and/or a wire-bound connection. As indicated above and below, a particular third server may be provided as a single unit arranged in a single network together with a corresponding second server. As used herein, the term "providing treatment data" refers to a process of forwarding the at least one piece of data related to the proposed treatment of the at least one substance being monitored as generated by the first server in order to enable a treatment of the at least one substance in accordance with the treatment data as indicated below in connection with step (iv) of the method for the in-situ monitoring of the at least one substance.

For this purpose, the third server may comprise or drive a user interface which is designated for providing at least one item of information related to the treatment data to a user. As used herein, the term "user interface" refers to a device which is designated for providing a piece of information, in particular the treatment data, electronically, visually, acoustically or in any arbitrary combination thereof to the user, preferably in a user-receptive manner, most preferred in a user-friendly manner. As generally used, the term "user-receptive manner" relates to a fashion of providing information to a human person such that the human person is capable of comprehending the received piece of information in the desired fashion. For this purpose, the user interface may, preferably, comprise at least one of a personal computer or a mobile communication device. As generally used, the term "personal computer" refers to a computer device which is, typically, placed at a fixed location, whereas the term "mobile communication device" relates to at least one of a smartphone, a tablet, or a personal digital assistant, which can be carried by the user and, thus, move together with the user. Consequently, it may, thus, be possible to provide the treatment data to the user at a fixed location to which the user can return again and again and/or to a location where the user currently is. In particular, the user interface may comprise a monitor which is designated for providing the at least one item of information related to the treatment data in a visual fashion by displaying it to the user, in particular by at least one of plain text in at least one language or a graphic symbol representing this corresponding piece of information. However, using a traffic light style representation having three indicators in green, yellow, and red as proposed in WO 2020/014073 A1 is not considered as "treatment data" since it does not comprise an unambiguous indication of a recommended procedure. Alternatively or in addition, the user interface may be designated for providing the at least one item of information related to the treatment data in an acoustic fashion, in particular by employing at least one loudspeaker, wherein the at least one loudspeaker may be located at least one of close to a location of the substance to be monitored or at a location where the user may, typically, reside. In this manner, it can be ensured that the information may reach the user even in an event in which he or she does not observe the monitor and may not carry a mobile communication device.

Alternatively or in addition, the third server may be designated for providing the treatment data to at least one of a treatment unit. Herein, the treatment data can be provided to at least one of a treatment unit in a direct manner, such as via wire-bound or a wireless connection, or in an indirect manner, such as via at least one further processing device. As generally used, the term "treatment unit" refers to at least one device designated for exerting an influence on the at least one substance in a fashion that the desired treatment of the at least one substance is performed in accordance with the treatment data. Preferred embodiments of the treatment unit are described below in more detail. However, further kinds of treatment units may also be conceivable.

Alternatively or in addition, the third server may be designated for providing the treatment data to at least one simulation system, wherein the simulation system may be comprised by at least one of the third server or a further processing device. As generally used, the term "simulation system" refers to at least one computer program which is configured to perform a modeling of an actual or an envisaged technical system by using at least one piece of data, in particular the treatment data, in order to observe a behavior of the technical system without being required to actually implement the technical system. With particular respect to the present invention, the simulation system can be used for at least one of predictive maintenance, optimization of parameters related to the technical system, or optimization of the modeling, depending on a current state of the technical system as modified by the treatment data. In addition, the treatment data can be accompanied by other data related to further technical systems for performing the modeling across multiple technical systems.

In particular accordance with the present invention, each server is configured to play a decisive role within the communication system. For this purpose, the system is configured to allow a processing of the spectral information acquired by an optical spectrometer of the substance to be monitored in a specifically adapted distributed fashion between the different servers. As a result thereof, the spectral information as used for the monitoring the at least one substance is provided by the user, while the processing of the spectral information is performed by a first instance which is familiar with an evaluation of the spectral information, and while the treatment data as desired by the user for being able to adequately treat the at least one substance is generated by a second instance being familiar therewith. Consequently, the communication system is, thus, capable of providing both distributed best practice with regard to the evaluation of the spectral information and, at the same time, a specific exchange of data under high data protection standards during the processing of the spectral information within in a, preferably fully, automatic procedure which is designated for generating the desired treatment data and to provide them to the user.

In particular, the spectroscopic data is generated in real-time at the site of the user and made available by the second server for further use. As long as the hardware which is designated for generating the spectroscopic data is not altered, neither a software update nor an alteration of infrastructure is required at the site of the user. Only spectroscopic data is generated and stored for transfer at the site of the user in a fashion which does not enable to generate any treatment data without the underlying calibration model. In contrast hereto, the actual treatment data is generated by the first server by using the at least one value for the at least one parameter as generated by the cloud server using the calibration model, whereby critical information, in particular related to the calibration model and the generation of the treatment data, can be safely managed and stored at two individual sites separated from each other. As illustrated below in the Figures, data from multiple users can be used to determine systematics. Herein, the calibration and treatment data models can be updated and re-found continuously without distorting the generation of the spectroscopic data at the site of the multiple users.

Based on these considerations, the first server comprises the first communication interface which is configured, firstly, to provide the reference spectral information referring to the at least one reference sample and the reference analytical data to the cloud server and, further, to receive the at least one value for the at least one parameter from the cloud. Thus, the first communication interface may, preferably, be arranged as a bidirectional interface or may, alternatively, comprise two individual unidirectional interfaces arranged in opposite direction. Further, the first server is further configured to determine the treatment data by using the at least one value for the at least one parameter as provided by the cloud server, and, further comprises the at least one third communication interface configured to provide the treatment data to the at least one third server.

In addition, the first server may be configured to receive the spectral information from the at least one second server via the second communication interface and to provide it to the cloud server via the fourth communication interface. Hereby, the first server may be configured to modify the spectral information. As generally used, the terms "modifying" and "modification" refer to an alteration of data, in particular of data carrying the spectral information, by applying at least one algorithm to the data, wherein the algorithm may be configured to exert at least one particular operation on the data. In accordance with the present invention, the operation may, preferably, be selected from at least one of: selecting, filtering, combining, classifying, grouping, or analyzing of data comprising the spectroscopic information or related metadata. However, further kinds of operations may also be feasible.

Further based on these considerations, each second server comprises a corresponding second communication interface which is configured to provide spectral information to the cloud server. As indicated above, the spectral information may be directly transmitted to the cloud server via the corresponding second communication interface or, preferably, firstly to the first server via the second communication interface and, subsequently, from the first server via the fourth communication interface to the cloud server. While selecting a direct transmission results in an advantage providing a direct connection between the at least one second server towards the cloud server, the indirect transmission results in a different advantage of requiring an overall less complex communication system since the cloud server only communicates with the first server while the first server is responsible for the communication with the other servers, i.e. the one or more second servers and the one or more third servers.

Further based on these considerations, the cloud server is configured to perform the above-indicated operations within the cloud server at least of generating the calibration model by using the reference spectral information which refers to the at least one reference sample and the reference analytical data as provided by the first server, of applying the calibration model which may comprise quantitative and qualitative modelling to the spectral information provided by the second server, thereby extracting at least one value for the at least one parameter, and of providing the at least one value for the at least one parameter to the first server via the first communication interface. For a purpose of generating and maintaining the infrastructure within the cloud server, wherein the infrastructure is required for performing the indicated operations within the cloud server, at least one additional server can be used.

In a particularly preferred embodiment, the calibration model may be generated by applying a combination of at least one data preprocessing method, a set of selected features, and at least one learning algorithm. As generally used, the term "data preprocessing method" refers to a process of modifying raw data, especially by using at least one of: scatter correction, baseline correction, smoothing, or scaling. Further, the set of selected features may refer to at least one particular data item, preferably selected from: at least one particular pixel or at least one particular wavelength. As further generally used, the term "learning algorithm" relates to a process of extracting at least one pattern in at least one known set of data, wherein the at least one pattern can, thereafter, be applied to at least one unknown set of data. In addition, by using further unknown sets of data the at least one pattern can further be refined. Herein, the learning algorithm may, preferably, be selected from a machine-learning algorithm or a deep learning algorithm.

In particular, the determining of the treatment data by using the at least one value for the at least one parameter may, preferably, be performed by applying the at least one learning algorithm to a combination of known values for known parameters with known treatment data. Herein, the learning algorithm may involve at least one algorithm selected from at least one of a regression algorithm or a classification algorithm. By way of, example at leastv one of the following algorithms may be used: partial least square regression; discriminant analysis; a Bayesian algorithm such as Naïve Bayes, Brute-force MAP learning, Bayes Belief Neworks, Bayes optimal classifier; Support Vector machines with multiple kernels; a decision tree algorithm such as random forest, CART; logistic and linear regression such as LASSO, Ridge, elastic net; a statistical analysis such as univariate generalized and mixed models; a neural network (NN) algorithm such as Fully connected NN, convolutional NN, recurrent NN; Gaussian modelling such as Gaussian process regression, Gaussian graphical networks; unsupervised learning methods such as non-negative matrix factorization, principal component analysis (PCA), t-sne, LLE. However, another kind of learning algorithms may also be feasible.

Further based on these considerations, each third server comprises a corresponding third communication interface which is configured to provide the treatment data to the at least one third server. As described above and below in more detail, each third server may, further, be configured to further process the at least one item of information related to the treatment data by at least one of displaying it to a user via a user interface, or by providing it to at least one of a treatment unit or a simulation system as described elsewhere herein.

In a further aspect of the present invention, a monitoring system for in-situ monitoring of at least one substance is disclosed. As further used herein, the term "monitoring" refers to a process of deriving desired information from, preferably continuously, acquired data without user interaction, wherein the term "measuring" relates to a process of acquiring a piece of data without user interaction. For this purpose, a plurality of measurement signals are generated and evaluated, wherefrom the desired information is determined. Herein, the plurality of the measurement signals may be recorded and/or evaluated within fixed or variable time intervals or, alternatively or in addition, at an occurrence of at least one prespecified event. As generally used, the term "in-situ monitoring" relates to acquiring the piece of data related to the at least one substance at the location where the at least one substance is already located, in particular without being required to collect a sample of the at least one substance and to analyze it a different location. Consequently, the monitoring system exhibits an advantage that it can be allocated at the location of the at least one substance in order to determine at least one property thereof.

As already indicated above, the term "system" refers to a device comprising at least two components, wherein at least two of the components are individual components, while two or more of the components may be integrated into one component, wherein the components are configured to perform a joint task, such as handling a type of monitoring. Thus, the term "monitoring system" as used herein refers to a system which comprises at least two individual components, wherein each component is designated for at least one of generating and evaluating measurement signals. In particular, the monitoring system according to the present invention may, especially, be designated for, preferably continuously, determining at least one parameter related to the at least one substance and to derive the desired treatment data therefrom.

Accordingly, the monitoring system for in-situ monitoring of at least one substance comprises:
  a communication system as described elsewhere herein;
  an optical spectrometer designated for
    acquiring spectral information related to the at least one substance;
    providing the spectral information to at least one server.

Consequently, the monitoring system according to the present invention comprises the communication system as described elsewhere herein and an optical spectrometer. As a result, it is, therefore, designated to generate optical signals which are used for determining the at least one parameter related to the at least one substance and to derive the desired treatment data therefrom. As generally used, the term "optical" refers to electromagnetic waves having a wavelength of 380 nm to 780 nm and adjoining wavelength ranges, in particular at least a portion of the near infrared (NIR) spectral range. In general, the NIR spectral range is considered to cover wavelengths of 780 nm to 2500 nm. However, the term "optical" is considered herein to cover further wavelengths outside the NIR spectral range, such as other infrared spectral ranges with wavelengths above 2.5 μm, in particular for wavelengths up to 2.6 μm, up to 3.1 μm, up to 3.5 μm, up to 5 μm, up to 5.5 μm, up to 6 μm, up to 20 μm, or up to 40 μm. Preferably, the wavelengths from 250 nm to 5 μm, preferably from 400 nm to 3 μm, more preferred from 1250 nm to 2.7 μm, are covered by the term "optical" according to the definition as used herein. Thus, the term "light" as used herein relates to radiation having a least one wavelength within the indicated wavelength ranges.

As further generally used, the term "spectrum" refers to a partition of the optical spectral range, especially of the near-infrared (NIR) spectral range as indicated above. Herein, each part of the spectrum is constituted by an optical signal, which is defined by a signal wavelength and the corresponding signal intensity. As further generally used, the term "optical spectrometer" relates to an apparatus which is capable of acquiring spectral information, wherein the term "acquiring spectral information" refers to recording the signal intensity with respect to the corresponding wavelength of a spectrum or a partition thereof, such as a wavelength interval, wherein the signal intensity may, preferably, be provided as an electrical signal which may be used for further evaluation. In particular for performing the monitoring process according to the present invention, the at least one optical spectrum of the at least one substance can repeatedly be acquired in-situ.

The optical spectrometer may, preferably, comprise a dispersive element. As generally used, the "dispersive element" refers to a device which is designated for separating incident light from the at least one substance into a spectrum of constituent wavelength signals whose respective intensities are, subsequently, determined in form of detector signals as generated by a single detector or a detector array as described below in more detail. Here, the dispersive element can, preferably, be selected from at least one diffractive element or at least one interferometric element. Herein, the at least one diffractive element may be selected from a prism or an optical grating, wherein the at least one interferometric element may be selected from an interference filter, in particular a bandpass filter, a band rejection filter, a Bragg filter, a length variable filter, such as a linearly variable filter, a Fabry-Perot interferometer or a Michelson interferometer. As generally used, the term "bandpass filter" refers to an optical element which is designed to transmit a band of wavelengths between two cut-off wavelengths while attenuating outside the band. As an alternative, a "band rejection filter" is designed to attenuate in the band while transmitting outside the band. As further generally used, the term "Bragg filter" relates to a particular type of band rejection filter which is comprised by a short segment of a core of an optical waveguide or a glass substrate. Herein, a periodic variation in the refractive index is used as a wavelength-specific dielectric mirror designed to attenuate the wavelengths in the band while allowing the wavelengths outside the band to pass undisturbed, thus, acting as a band rejection filter. As further generally used, the term "length variable filter" refers to an optical filter comprising a plurality of interference filters, in particular bandpass filters, which may, particularly, be provided in a continuous arrangement of the filters. Herein, each of the filters may form a bandpass with a variable center wavelength for each spatial position on the filter, preferably continuously, along a single dimension denoted by the term "length" on a receiving surface of the length variable filter. Preferably, the variable center wavelength may be a linear function of the spatial position on the filter, in which case the length variable filter is referred to as a "linearly variable filter". However, other kinds of functions may be applicable to the relationship between the variable center wavelength and the spatial position on the filter. In a particular embodiment, the length variable filter may be a wedge filter, which is designated for carrying at least one response coating on a transparent substrate, wherein the response coating may exhibit a spatially variable property, in particular, a spatially variable thickness. Further, the "Fabry-Perot interferometer" comprises an optical cavity having two parallel reflecting surfaces which allow only optical waves to pass through the optical cavity when they are in resonance with the optical cavity. In addition, a further optical element which is designed for receiving incident light and transferring it to the dispersive element can be used. For further details, reference may be made to WO 2019/115594 A1, WO 2019/115595 A1, or WO 2019/115596 A1.

As an alternative, the optical spectrometer may comprise at least one Fourier-transform infrared spectroscopy (FTIR) spectrophotometer. Herein, the optical spectrometer may comprise at least one broadband light source and at least one interferometric element, such as a Michelson interferometer. The FTIR spectrophotometer may be configured for providing illumination with at least one light beam having a time-dependent spectrum. For this purpose, the FTIR spectrophotometer may, preferably, comprise at least one moving mirror element, wherein by movement of the mirror element a light beam generated by the broadband light source can alternatingly be blocked and transmitted by the interferometric element. The optical spectrometer may, furthermore, comprise at least one microelectromechanical system (MEMS) which may be configured for controlling the mirror element. Further, the FTIR spectrophotometer may be configured to modulate the light beam depending on the wavelength such that different wavelengths are modulated at different rates.

The light may impinge on a single detector or on the detector array. As generally used, the term "detector array" relates to a device comprising a plurality of optical sensors designated for measuring an intensity of the incident light impinging at least one of the optical sensors. Herein, each sensor may, preferably be designated for measuring the intensity of the incident light at a particular wavelength. Therefore, the detector array may, preferably, comprise a sequence of optical sensors that may be located in form of a series of optical sensors one following the other, wherein the sequence of the optical sensors may, preferably, be placed in a parallel manner with respect to the continuous arrangement of the respective optical filters along the length of the length variable filter. Thus, the detector array may, preferably, comprise a series of individual optical sensors which may, in particular, be arranged in a single line as a one-dimensional matrix, preferably along the length of the length variable filter, or in more than one line, especially as two, three, or four parallel lines, in form of a two-dimensional matrix, in particular, in order to receive as much of the intensity of the incident light as possible. Thus, a number N of pixels in one direction may be higher compared to a number M of pixels in a further direction such that the one-dimensional 1×N matrix or a rectangular two-dimensional M×N matrix may be obtained, wherein M<10 and N≥10, preferably N≥20, more preferred N≥50. In addition, the matrixes used herein may also be placed in a staggered arrangement. Herein, each optical sensor may have the same or, within a tolerance level, a similar optical sensitivity, especially for ease of manufacturing the series of the optical sensors. Alternatively, each of the optical sensors as used in the series of the optical sensors may exhibit a varying optical sensitivity that may vary in accordance with the varying transmittance properties of the length variable filter, such as by providing an increasing variation or a decreasing variation of the optical sensitivity with wavelength along the series of the optical sensors. However, other kinds of arrangements may also be feasible.

In particular, a detector array may be used which may comprise a plurality of pixelated sensors, wherein each of the pixelated sensors is adapted to receive at least a portion of one of the constituent wavelength signals as provided by the dispersive element. As indicated above, each constituent wavelength signal is, hereby, related to an intensity or an amplitude of each constituent wavelength. As generally used, the terms "pixelated optical sensor" or "pixelated sensor" refer to an optical sensor which comprises an array of individual pixel sensors, wherein each of the individual pixel sensors has at least a radiation sensitive area which is adapted for generating an electrical signal depending on the intensity of the incident light, wherein the electrical signal may, in particular, be provided to an evaluation unit for further evaluation. Herein, the radiation sensitive area as comprised by each of the individual pixel sensors may, especially, be a single, uniform radiation sensitive area which is configured for receiving the incident light which impinges on the individual pixel sensor. However, other arrangements of the pixelated sensors may also be conceivable. Further, as indicated above, a single detector having a single radiation sensitive area may also be feasible.

The sensor is designed to generate detector signals, preferably electronic signals, associated with the intensity of the incident light which impinges on the individual pixelated sensor. The detector signal may be an analogue and/or a digital signal. The electronic signals for adjacent optical sensors can, accordingly, be generated simultaneously, or else in a temporally successive manner. By way of example, during a row scan or line scan, it can be possible to generate a sequence of electronic signals which correspond to the series of the individual optical sensors which are arranged in a line. In addition, the individual sensors may, preferably, be active sensors which may be adapted to amplify the electronic signals prior to providing it to the evaluation unit. For this purpose, the optical sensor may comprise one or more signal processing devices, such as one or more filters and/or analogue-digital-converters for processing and/or preprocessing the electronic signals.

The optical sensor may be selected from any known optical sensor, in particular a pixelated sensor, preferably from a pixelated organic camera element, especially a pixelated organic camera chip, or from a pixelated inorganic camera element, especially a pixelated inorganic camera chip, in particular from a CCD chip or a CMOS chip, which are, commonly, used in various cameras. Herein silicon (Si) can, typically, be used for wavelengths up to 1.1 µm. As an alternative, especially for wavelengths above 1.1 µm, the radiation sensitive area of the optical sensor may comprise a photodetector, in particular an inorganic photodetector selected from at least one of gallium antimonide (GaSb), in particular for wavelengths up to 1.7 µm; germanium (Ge), in particular for wavelengths up to 1.85 µm; indium gallium arsenide (InGaAs), in particular for wavelengths up to 2.5 µm; indium arsenide (InAs), in particular for wavelengths up to 3.5 µm; lead sulfide (PbS), in particular for wavelengths up to 3.5 µm; indium antimonide (InSb), in particular for wavelengths up to 5.5 µm; lead selenide (PbSe), in particular for wavelengths up to 6 µm; and mercury cadmium telluride (MCT, HgCdTe), in particular for wavelengths up 20 µm. However, other photodetectors or further kinds of materials may also be feasible, in particular a pyroelectric detector comprising a radiation sensitive material, preferably, selected from triglycine sulfate (TGS) or deuterated triglycine sulfate (DTGS) can, in particular, be used for wavelengths up to 40 µm. Herein, it may particularly be preferred when the spectral sensitivities of the detector may exhibit a spectral range which may be closely related to an emission spectrum of the light source, particularly to ensure that the detector may be capable of providing a detector signal having a high intensity, thus, enabling an evaluation of the detector signals with sufficient signal-to-noise-ratio and, at the same time, a high-resolution. In a preferred embodiment, the monitoring system may comprise an optical probe designated for measuring the optical signals related to the at least one substance. In this embodiment, the optical spectrometer may be designated for acquiring the spectral information related to the at least one substance by using the measured optical signals as provided by the probe. As generally used, the term "optical probe" refers to a device which is designated for measuring optical signals by acquiring at least one measurement signal, also denoted here as "optical signal", preferably at the location or close to the location of the at least one substance to be monitored. Herein, at least a portion of a surface of the optical probe can, in particular, comprise a cover having selected properties which may be capable of increasing a life-time of the optical probe, especially within a harsh environment. In particular, a surface of the optical probe or at least a portion thereof may be or comprise an anti-adhesive surface which is designated for impeding an adhesion of the at least one substance, such as a liquid, in particular a hot frying oil or at least one degradation product thereof, on the surface of the optical probe. As an advantage thereof, an adverse interaction between the optical probe and the at least one substance to be monitored can be avoided, wherein the adverse interaction may, eventually, damage or destroy the optical probe or at least a portion thereof.

In addition, the optical probe may be designated for providing radiation for illuminating the location of the at least one substance. However, in case the location of the at least one substance may already have been sufficiently illuminated, such a function of the optical probe may be dispensable. However, since the preferred wavelength range to be used in connection with the present invention is, as presented above, a spectral range which is considered to cover wavelengths that are not necessarily available at the location of the at least one substance in sufficient intensity, it is preferred that the optical probe may be designated for providing the desired radiation for illuminating the location of the at least one substance.

Thus, the optical probe may, preferably, be used for both providing the radiation and generating at least one optical signal resulting from an interaction of the radiation with a portion of the at least one substance at the location of the at least one substance. For this purpose, the optical probe may comprise a setup which may, specifically, be adapted to a geometry of the at least one substance and/or a geometry of a receptacle which comprises at least a portion of the at least one substance. In particular, the setup may, be selected from at least one of a transmittance geometry, a transflexion geometry, or a reflection geometry, such as a diffuse reflection geometry or an attenuated total reflection geometry. As illustrated below in more detail, the transmission geometry may, especially, be preferred in case the at least one substance to be monitored may comprise a transparent material selected from at least one of a liquid, a gas, a powder, or a granulate, in which case it may be advantageous to transmit a thickness of a layer of the at least one substance. Herein, the setup for the transmittance geometry can, preferably, be designated for guiding light through the thickness of a layer of the at least one substance to be monitored, in particular of 0.1 mm, preferably of 1 mm, more preferred of 2 mm, to 20 mm, preferably of to 8 mm, more preferred to 5 mm. However, in case the at least one substance to be monitored may comprise an intransparent material, such as a powder, a granulate or a bulk material, a reflection geometry may be more preferred. With regard to the terms "transparent" or "intransparent", is indicated that a respective grade of transparency refers to the particular wavelength or wavelength range applied to the at least one substance, in particular to the grade of transparency within the NIR spectral range.

Further, for providing a connection between the optical probe and the optical spectrometer for guiding the optical signals as generated by the optical probe to the optical spectrometer for evaluation and, preferably also for a further connection between a light source designated for generating the illumination having the desired spectral range, in particular within the NIR spectral range, and the optical probe at least one optical waveguide, such as at least one optical fiber, may be used. However, further kinds of connections may also be feasible.

In a particular embodiment, the optical probe may comprise at least one tube, preferably two individual tubes, wherein the at least one tube is designated for receiving the at least one connection. Further, the optical probe can comprise a mount to which the at least one tube may be attached. For this purpose, fastening elements, such as screws, may be used. Herein, the mount may, preferably, be a rigid mount, thus, being capable of providing a desired stability to the optical probe, while the at least one tube may, preferably, be a flexible tube, thus, providing a certain level of flexibility which can be advantageous in a harsh environment, such as in a liquid, in particular in a hot or toxic liquid, or in a volume comprising powders, granulates or bulk materials, in particular, in order to reduce a danger of damage.

In addition, the monitoring system, in particular the optical probe, may comprise at least one additional sensor which may be designated for measuring additional substance-related information of the at least one substance, wherein the term "additional substance-related information" refers to at least one item of data which is further related to the at least one substance in addition to the at least one piece of information about the at least one substance that is acquired by using the optical spectrometer. In particular, the further substance-related information may, preferably, be selected from at least one of: a temperature, a density, a flux, a conductivity, a viscosity, electromagnetic fields, a dielectric constant, a refractive index, a fluorescence, a phosphorescence, a magnetization value, a pH Value, a buffering capacity, an acid value, or a zeta-potential. However, further kinds of additional substance-related information may also be feasible. For a purpose of determining at least one additional substance-related information, the additional sensor may, preferably, be attached to the mount of the probe, wherein leads for a power supply or a data read-out could, preferably, be guided via the at least one tube. In addition, further elements which can be attached to the optical probe are conceivable. As a further alternative, the probe may be or comprise at least one lab-on-chip system or at least one microfluidic system being designated for analyzing at least one chemical and/or bio-chemical quantity, in particular composition of a body fluid, such as blood, urine, saliva, eye liquid, or an interstitial fluid.

Further, the optical spectrometer comprises an evaluation unit which is designated for generating the spectral information that is related to a spectrum of the at least one substance by evaluating the detector signals as provided by the detector. As generally used, the term "evaluation unit" refers to an arbitrary device which is designed for generating information based on detector signals. For this purpose, the evaluation unit may be or comprise at least one integrated circuit, such as one or more application-specific integrated circuits (ASICs), and/or one or more digital signal processors (DSPs), and/or one or more field programmable gate arrays (FPGAs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. Further, the evaluation unit may comprise at least one data storage device. Further, as outlined above, the evaluation unit may comprise at least one interface, such as a wireless interface and/or a wire-bound interface. In addition, the optical spectrometer, in particular the evaluation unit, can further be designated for determining data related to the at least one substance as described elsewhere herein. For this purpose, the evaluation unit may comprise or have access to further evaluation routines which are configured to determine the data related to the at least one substance from at least one of the spectral information, the optical signals as provided by the detector array, or the sensor signals as provided by the at least one additional sensor. In addition, the optical spectrometer, in particular the evaluation unit, can further be designated for determining additional substance-related information of the at least one substance as described elsewhere herein. For this purpose, the evaluation unit may comprise or have access to even further evaluation routines which are configured to determine the additional substance-related information from measured signals as provided by the at least one of the additional sensor.

Herein, the spectral information which can be used for monitoring the substance as generated by the optical spectrometer, in particular by the evaluation device as comprised by the optical spectrometer can, preferably, be provided by a data transfer unit to the at least one server, in particular to the at least one second server comprised by the communication system as described elsewhere herein. As used herein, the term "data transfer unit" refers to an arbitrary device designated for transmitting the spectral information from an optical spectrometer to at least one second server as comprised by the communication system in a wire-bound transmission or a wireless transmission. For this purpose, the data transfer unit can, preferably, be selected from at least one of a universal serial bus (USB) or a Bluetooth enabled device. However, further methods and devices which are configured to enable a data transfer between the optical spectrometer, in particular the evaluation device of the optical spectrometer, and the corresponding second server, may also be conceivable.

Further, the optical spectrometer may comprise further components, such as a light source. As used herein, the term "light source" refers to a kind illumination source which is known to provide sufficient emission in at least one of the wavelength ranges as indicated above. Thus, the illumination source may, be selected from at least one of an incandescent lamp, a thin film filament, or MEMS system that emits a black-body spectrum, a flame source; a flame source; a heat source; a laser, in particular a laser diode, although further types of lasers can also be used; a light emitting diode; an organic light source, in particular an organic light emitting diode; a neon light; a structured light source. However, other kinds of illumination sources can be used, such as a thermal infrared emitter. As used herein, the term "thermal infrared emitter" refers to a micro-machined thermally emitting device which comprises a radiation emitting surface that is designated for emitting the desired radiation. By way of example, thermal infrared emitters are available under the name "emirs50" from Axetris A G, Schwarzenbergstrasse 10, CH-6056 Kägiswil, Switzerland, as "thermal infrared emitters" from LASER COMPONENTS GmbH, Werner-von-Siemens-Str. 15 82140 Olching, Germany, or as "infra-red emitters" from Hawkeye Technologies, 181 Research Drive #8, Milford CT 06460, United States. However, further types of thermal infrared emitters may also be feasible.

Herein, the light source may be a continuous light source or, as an alternative, a pulsed light source, wherein the pulsed light source may have a modulation frequency of at least 1 Hz, of at least 5 Hz, of at least 10 Hz, of at least 50 Hz, of at least 100 Hz, of at least 500 Hz, of at least 1 kHz, or more. In a particular embodiment, at least one of the optical spectrometer or the light source can comprise a modulation device designated for modulating the illumination, preferably a periodic modulation. As generally used, the term "modulation" refers to a process in which a total power of the illumination is varied, preferably periodically, in particular with at least one modulation frequency. In particular, a periodic modulation can be effected between a maximum value and a minimum value of the total power of the illumination. The minimum value can be 0, but can also be >0, such that, by way of example, complete modulation does not have to be effected. Herein, the modulation can, preferably, be effected within the light source designated for generating the desired modulated illumination, preferably, by the light source itself having a modulated intensity and/or total power, for example a periodically modulated total power, and/or by the light source being embodied as a pulsed illumination source, for example as a pulsed laser. As a further example, a device for generating radiation as disclosed in European patent application 19 21 32 77.7, filed Dec. 3, 2019, can also be used for this purpose, wherein the device comprises at least one radiation emitting element, wherein the radiation emitting element is designated for generating radiation upon being heated by an electrical current; a mount, wherein the mount carries the at least one radiation emitting element, and wherein the mount or a portion thereof is movable; and a heat sink, wherein the heat sink is designated for cooling the mount and the at least one radiation emitting element being carried by the mount upon being touched by the mount. Alternatively or additionally, a different type of modulation devices, for example modulation devices based on an electro-optical effect and/or an acousto-optical effect, can also be used. However, a modulation of the light beam at any position within a beam path may also be conceivable, wherein a beam chopper or a different type of periodic beam interrupting device, such as an interrupter blade or interrupter wheel, preferably rotating at constant speed and can, thus, periodically interrupt the illumination, can also be used. Accordingly, the detector array can be designated for detecting at least two detector signals in the case of different modulations may have different modulation frequencies. Herein, the evaluation unit can be designated for generating the spectral information from the at least two detector signals.

As already indicated above, the term monitoring system can comprise at least two components which may be integrated into a single component. As an advantage thereof, the handling of the integrated components, especially by a user, may be facilitated. Accordingly, the light source and the optical spectrometer can, preferably, be integrated into a single unit. Alternatively, the optical probe and the optical spectrometer can, preferably, be integrated into a single unit. As a further alternative, the light source, the optical probe and the optical spectrometer can, preferably, be integrated into a single unit. Further, the second server and the third server can be integrated into a single unit. Alternatively or in addition, the optical spectrometer, the data transfer unit, and the second server, can integrated into a single unit. By way of example, the optical spectrometer, the light source, the data transfer unit, the second server, and the third server can be integrated into a single unit. However further kinds of integrated components may also be feasible.

In a further aspect of the present invention, a computer-implemented method for operating a communication system is disclosed. Thus, the methods according to the present invention are computer-implemented methods. As generally used, the term "computer-implemented method" refers to a method which involves a programmable apparatus, in particular, a readable medium carrying a program, a computer, or a computer network, whereby one or more of the features of the invention are performed by means of at least one program. In accordance with the present invention, the at least one program may be accessible by an apparatus being adapted to perform the respective method via a communication system, in particular the communication system as described elsewhere herein, which can, preferably, be available via internet. With particular regard to the present invention, the present method can, thus, being performed on a programmable apparatus which is configured to this purpose, such as by providing at least one adapted computer program. As a result, the methods according to the present invention may, in particular, affect the in-situ monitoring of the at least one substance, for which purpose the computer-implemented method for operating the communication system as described herein is employed. As further used herein, the terms "operating" and "operation" refer to a sequence of method steps which are configured to effect a functioning of the communication system in a desired fashion.

The method for operating the communication system as disclosed herein comprises the following steps, which may, preferably, be performed in the given order. Further, additional method steps can be provided which are not listed here. Unless explicitly indicated otherwise, any or all of the method steps, in particular of adjacent method steps, may, at least partially, be performed in a simultaneous manner. Further, any or all of the method steps might be performed at least twice, such as in a repeated fashion, in particular in order to allow repeatedly performing the in-situ monitoring process according to the present invention as described below in more detail.

Thus, the method for operating the communication system according to the present invention, wherein the communication system comprises a cloud server, a first server, at least one second server, and at least one third server, comprises the following steps:
  a) providing reference spectral information referring to at least one reference sample and reference analytical data from the first server via a first communication interface to the cloud server;
  b) generating a calibration model in the cloud server by using the reference spectral information referring to the at least one reference sample and the reference analytical data, wherein the calibration model comprises at least one parameter;
  c) providing spectral information related to at least one substance from the second server via a second communication interface to the cloud server;
  d) applying the calibration model in the cloud server to the spectral information related to the at least one substance, whereby at least one value for the at least one parameter is extracted;
  e) providing the at least one value for the at least one parameter to the first server via the first communication interface;
  f) determining treatment data by using the at least one value for the at least one parameter provided by the cloud server to the first server, wherein the treatment data comprise at least one piece of data which is related to a proposed treatment of the at least one substance;
  g) providing the treatment data from the first server via a third communication interface to the third server.

In a further aspect of the present invention, a computer-implemented method for in-situ monitoring of the at least one substance is disclosed. With regard to the term "computer-implemented method", reference can be made to the definition provided above. The method as disclosed herein comprises the following steps, which may, preferably, be performed in the given order. Further, additional method steps can be provided which are not listed here. Unless explicitly indicated otherwise, any or all of the method steps, in particular of adjacent method steps, may, at least partially, be performed in a simultaneous manner. Further, any or all of the method steps might be performed at least twice, such as in a repeated fashion, in particular in order to allow performing the in-situ monitoring process in a manner to repeatedly acquire at least one optical spectrum of the at least one substance, to repeatedly derive treatment data therefrom via an evaluation unit, and to repeatedly provide the treatment data to a user for enabling the treatment of the at least one substance in accordance therewith.

Accordingly, the computer-implemented method for the in-situ monitoring of the at least one substance comprises the following steps:
  (i) acquiring at least one optical reference spectrum of at least one reference sample, wherein each reference sample comprises the at least one substance to be monitored, wherein reference analytical data are assigned to each reference sample, and deriving reference spectral information referring to the at least one reference sample from the at least one optical reference spectrum;
  (ii) acquiring at least one optical spectrum of the at least one substance in-situ, and deriving spectral information related to the at least one substance in-situ from the at least one optical spectrum;
  (iii) performing the steps of the method according to the computer-implemented method for operating the communication system as described elsewhere herein;
  (iv) treating the at least one substance in accordance with the treatment data.

In a further aspect, the present invention refers to a computer program product. As generally used, the "computer program product" refers to executable instructions for performing at least one of the methods, preferably both methods as indicated above, according to the present invention. For this purpose, a computer program may comprise instructions provided by means of a computer program code which are configured to perform any or all of the steps of the methods according to the present invention and, thus, to establish a generation of an image of an object when implemented on a computer or a data processing device. The computer program code may be provided on a data storage medium or a separate device such as an optical storage medium, e.g. on a compact disc, directly on a computer or data processing device, or via a network, such as an in-house network or the internet, such as in the cloud.

For further details concerning the computer-implemented methods as well as a related computer program product, reference may be made to the systems according to the present invention as disclosed elsewhere herein.

In a further aspect of the present invention, a use of the communication system, the monitoring system for in-situ monitoring of at least one substance, wherein the monitoring system comprises the communication system, and the related methods according to the present invention is disclosed. Herein, the communication system, the monitoring system for the in-situ monitoring of the at least one substance and the related methods may, preferably, be used for a purpose of use selected from the group consisting of:
    food or beverage control or monitoring, in particular selected from food and/or beverage control, characterization, analysis, classification or evidence of ingredients, allergens or contaminants; including but not limited to frying oil characterization; monitoring of coffee roasting and quality; analysis of quality, freshness, ripeness, concentration of contents such as carbohydrates, fats, proteins, caffeine, sugar, fiber, moisture, acid, or nuts; classification into vegan and non-vegan food; classification into virgin and extra-virgin olive oil; evidence of bacteria in food or melamine in milk powder;

industrial process control, in particular selected from synthesis control, emulsion stability control, quality control, blend formation, uniformity control, combustion monitoring, oil degradation monitoring;

material classification or characterization, in particular selected from inbound control, exit control, plastics detection and sorting, plasticizer detection in plastics, waste sorting and recycling, lubricant or fuel characterization; material control at filling nozzles or tank wagons; construction materials, such as quality control of power poles, concrete, fire protection materials, or screw anchors; textile classification, such as into different fibers; detection and characterization of contaminants;

product anti-counterfeiting, in particular selected from authentication of banknotes, passports and personal identification cards, detection of IR markers, detection of optical taggants, authentication of products without taggants;

characterization of living matter, in particular selected from a characterization of plants or parts thereof, including fruits, seeds, or leaves; soil analysis; detection and characterization of contaminants;

health applications, in particular selected from a detection of alcohol in blood through skin, determination of glucose level in blood, excrement analysis (sugar, blood, carbohydrates, proteins, fats); skin analysis (moisture, lipids, proteins) e.g. for cosmetic applications; hair analysis; determination of muscle oxygenation or oxidative energy metabolism; air quality monitoring.

However, further kinds of uses may also be conceivable.

With particular regard to food control, in particular with respect to monitoring a deep-frying process, the at least one parameter can, preferably, be selected from at least one of a indicator related to a thermo-oxidative oil degradation or oil degradation by hydrolysis, preferably chosen from at least one of total polar compounds (TPC), diacylglycerols and polymerized triacylglycerols (DPTG), an anisidine value (AnV), an acid value (AV), such as a determined by using standard (e. g. DGF) methods; a fatty acid composition, a free fatty acids concentration, a trans fatty acids concentration, an iodine value (IV), a content of monomeric oxidized tri-acylglycerols (MonoxTG); or a sensory parameter, such as at least one of a taste-related or an appearance-related indicator of the fried food. While typical NIR spectra of degraded oil samples range in the wavenumber from 12,000 to 4,000 cm$^{-1}$, corresponding to 833 nm to 2,500 nm (see, e.g., Wang et al., Anal. Methods 6, p. 7628, 2014), the most pronounced features are found in the wavenumber range from 9,000 to 4,000 cm$^{-1}$. Wherein a strong absorption around 4,000 cm$^{-1}$ may impede the extraction of information in that region. Based on at least one value for the at least one selected parameter, the treatment data can, particularly, comprise a recommended procedure for a treatment of the frying oil, such as replacing the frying oil at a particular point in time, such as now or at a later instant, or by adding an at least one additional substance to the at least one substance. However, further kinds of treatment data are conceivable. As indicated above and described in the examples below, the treatment data can trigger at least one of the user or at least one treatment unit to perform such an action.

With particular regard to air quality monitoring, in particular indoor air quality monitoring, a concentration of at least one of carbon dioxide ($CO_2$), carbon monoxide (CO), ozone ($O_3$), or other volatile organic compounds may be monitored, wherein the treatment data can, in particular, comprise a recommendation for an operation of a ventilation for indoor premises. Further, the treatment data can, in particular, comprise a recommendation whether the engine of a car is to be started or not, depending on a concentration of carbon dioxide ($CO_2$), or ethanol ($C_2H_5OH$), wherein for determining a parameter related to ethanol the optical probe may, preferably comprise a breath analyzer for the user.

With particular regard to combustion monitoring, a concentration of at least one of a sulfur oxide ($S_2O$, SO, $SO_2$, $SO_3$, or others), a nitrogen oxide (NO, $NO_2$, or others), a carbon dioxide (CO, $CO_2$, or others), or ozone ($O_3$), may be monitored, wherein the treatment data can, in particular, comprise a recommendation for an adjustment of at least one of an engine or a catalytic converter.

With particular regard to a characterization of lubricants, an additive concentration or at least one degradation parameter, e.g. oxidation, nitration, soot/particle concentration, acid number (AN), total acid number (TAN), total base number (TBN), sulphur concent, coolant content, viscosity, or water content, can be monitored, wherein the treatment data can, in particular, comprise a recommendation whether to replace the lubricant or not or whether to add or refill an additive or not.

With particular regard to plastics sorting and recycling, a polymer or an additive such as a plasticizer can be identified in the monitoring process, wherein the treatment data can, in particular, comprise a recommendation for at least one of an acceptance or a rejection of the object comprising the polymer, or a receptacle, such as a container, to which the object comprising the polymer may be allocated.

With particular regard to soil analysis, at least one parameter indicative of soil quality can be monitored, wherein the treatment data can, in particular, comprise a recommendation for a recommended procedure for a treatment of the soil or an application of a fertilizer that may be adjusted to a specific crop.

With particular regard to a characterization of fruits, such as tomatoes, or grapes, or products thereof, such as fruit juices or smoothies, a parameter selected from at last one of a ripeness or a sweetness, such as a Brix value can be monitored, wherein the treatment data can, in particular, comprise at least one of a quality estimation; a recommendation for a storage condition; whether to eat the fruit; or whether to start harvesting the fruit.

With particular regard to a characterization of potatoes, a parameter selected from at last one of a starch content, a moisture content, a sugar content can be monitored, wherein the treatment data can, in particular, comprise a recommendation for a storage condition or a classification of the monitored potatoes.

With particular regard to a characterization of oil seeds, such as selected from soy, canola, or cotton seeds, a parameter selected from at last one of an oil content, a fatty acid profile, a free fatty acid content, a moisture content, or a protein content, can be monitored, wherein the treatment data can, in particular, comprise a recommendation for at least one of a quality indication, a differentiate commodity, or a trait enhanced produce.

With particular regard to a characterization of crops, such as wheat, corn, barley, or oat, a parameter selected from at last one of a protein content, a starch content, or a moisture content can be monitored, wherein the treatment data can, in particular, comprise a recommendation for the calibration model comprises at least one parameter optimal harvest time, such as harvest now or not, a quality indication, a commodity vs. a trait enhancement.

With particular regard to leaf characterization, the treatment data can, in particular, comprise a recommendation for a countermeasure to a disease, drought stress, and or irrigation.

As further used herein, the term "substance" refers to at least one compound comprised by an arbitrary object or a portion thereof for which the spectral information is generated, in particular by using the monitoring device according to the present invention, and provided via the second communication interface of a second server. Consequently, the at least one substance may be selected from at least one of a liquid; a gas; a solid body, in particular a powder, a granulate, or a bulk material; or a mixture thereof, wherein, in general, the at least one substance depends on the particular use of the monitoring system comprising the communication system and the related methods according to the present invention. Herein, a particular substance may comprise at least one component, wherein a composition of the substance can remain constant or change during the monitoring of the particular substance.

As already defined above, the term "parameter" refers to a representation of an influence to analytical data with respect to the particular substance. Alternatively or in addition, at least two parameters may be combined for generating a further parameter. Thus, the at least one parameter assigned to the calibration model, similarly, depends on the particular use of the monitoring system comprising the communication system and the related methods according to the present invention. Specifically, the at least one parameter can be selected from at least one of:
- a regression value, in particular selected from a concentration of at least one of the substance, of at least one component of the substance, of at least one degeneration product of the substance, of at least one byproduct generated by a degeneration of the substance; a stability of a component; a grade of manufacture, an age of a substance;
- a classification value, in particular for identifying at least one substance;
- a clustering value, in particular for forming of clusters related to the at least one substance;
- a sensory parameter, in particular selected from at least one of a shape, a size, a location, an orientation;
- an extracted feature, in particular selected from at least one feature related to the spectral information.

As a result thereof, the treatment data which are determined by using the at least one value for the at least one parameter also depends on the particular use of the monitoring system comprising the communication system and the related methods. Thus, the treatment data can, in particular, comprise at least one of:
- a statement about an identification of the at least one substance;
- a statement about an authenticity of the at least one substance or a product comprising the at least one substance;
- a statement about an origin of the at least one substance;
- a statement about a presence or an absence of a state of the at least one substance, such as an occurrence of a disease;
- a statement about a property of the at least one substance, in particular selected from a quality, a concentration, a type of the at least one substance;
- a statement about a property of a component of the at least one substance, in particular selected from a concentration of the component of the at least one substance;
- a statement about the stability of a mixture of the at least one substance with at least one another substance;
- a statement about a recommended procedure based on a value of the at least one parameter.

Herein, the recommended procedure may be selected from at least one of:
- replacing at least a portion of the at least one substance at a determined point or range of time;
- adding a further amount to the at least one substance;
- adding a further substance to the at least one substance, such as for treating with a medicament;
- postponing the adding of a further substance to the at least one substance;
- removing the at least one substance;
- altering at least one of a temperature or a pressure acting on the at least one substance;
- performing a harvesting procedure;
- postponing a harvesting procedure;
- accepting or rejecting at least one object;
- recommending or not recommending at least one object;
- consuming or not consuming at least one object;
- accepting or rejecting at least one object at an input control or an exit control;
- sorting at least one object, specifically in a particular container, preferably for recycling;
- storing at least one object, especially at a particular storage condition or location;
- cleaning of at least one object.

Particularly depending on the kind of substance to be treated, the treatment unit may, preferably, be selected from at least one of:
- a storage container designated for stocking a further amount of at least one substance or of a different substance and for providing a portion thereof;
- a processing unit designated for homogenizing the at least one substance and/or for mixing at least two different substances;
- a cleaning unit designated for cleaning the at least one substance;
- a waste container designated for receiving used substance;
- a valve control unit designated for controlling at least one valve, wherein controlling the valve may allow adjusting a supply or a removal of the at least one substance;
- a sorting unit designated for allocating a portion of the at least one substance;
- an illumination control unit designated for being capable of alternating an illumination of the at least one substance;
- a temperature control unit designated for altering a temperature of the at least one substance;
- a pressure control unit designated for altering a pressure on the at least one substance;
- a heating unit designated for impinging the at least one substance with heat, wherein heating the at least one substance may induce a physical or chemical reaction of the at least one substance;
- a cooling unit designated for cooling the at least one substance, wherein the cooling of the at least one substance may result in impeding or finishing a physical or chemical reaction of the at least one substance.

However, further kinds of treatment units may also be conceivable.

Thus, the communication system, the monitoring system for in-situ monitoring of at least one substance comprising the communication system, and the related methods are capable of providing an efficient monitoring to the at least one substance, hereby allowing the at least one substance to be placed at any location, even in a remote or hardly inaccessible area, at premises of a user. Further, a processing of measurement data which are acquired at or near the location of the at least one substance is distributed between a first instance represented by the infrastructure for performing the indicated operations within the cloud server, which may be generated and maintained by at least one additional server, wherein the first instance is familiar with the evaluation of the measurement data, and a second instance represented by the first server, wherein the second instance is familiar with providing the treatment data, which are, eventually, based on the evaluated measurement data, to the user. Hereby, the systems and the related methods are capable of concurrently applying both distributed best practice and a specific exchange of data under high data protection standards to the user during processing the measurement data in a, preferably fully, automatic procedure.

Summarizing, in the context of the present invention, the following embodiments are regarded as particularly preferred:

Embodiment 1: A communication system, the communication system comprising a cloud server, a first server, at least one second server, and at least one third server; wherein the first server further has a first communication interface configured to provide reference spectral information and reference analytical data to the cloud server; wherein each second server has a second communication interface configured to provide spectral information to the cloud server;
wherein the cloud server is configured to
generate a calibration model by using the reference spectral information and the reference analytical data provided by the first server, wherein the calibration model comprises at least one parameter;
apply the calibration model to the spectral information provided by the second server, whereby at least one value for the at least one parameter is extracted;
provide the at least one value for the at least one parameter to the first server via the first communication interface;
wherein the first server is further configured to determine treatment data by using the at least one value for the at least one parameter provided by the cloud server;
wherein the first server further has at least one third communication interface, wherein each third communication interface is configured to provide the treatment data to the at least one third server.

Embodiment 2: The communication system according to the preceding Embodiment, wherein the second communication interface is configured to provide the spectral information directly or indirectly to the cloud server.

Embodiment 3: The communication system according to the preceding Embodiment, wherein the spectral information is provided indirectly to the cloud server by providing the spectral information to the first server, wherein the first server further has a fourth communication interface configured to provide the spectral information to the cloud server.

Embodiment 4: The communication system according to any one of the preceding Embodiments, wherein the parameter is selected from at least one of: a regression value, a classification value, a clustering value, a sensory parameter, an extracted feature.

Embodiment 5: The communication system according to any one of the preceding Embodiments, wherein the third server comprises or drives a user interface designated for displaying at least one item of information related to the treatment data to a user.

Embodiment 6: The communication system according to the preceding Embodiment, wherein the user interface comprises a personal computer or mobile communication device.

Embodiment 7: The communication system according to the preceding Embodiment, wherein the mobile communication device is at least one of a smartphone, a tablet, or a personal digital assistant.

Embodiment 8: The communication system according to any one of the preceding Embodiments, wherein the treatment data comprise at least one piece of data which is related to a proposed treatment of the at least one substance.

Embodiment 9: The communication system according to any one of the preceding Embodiments, wherein the treatment data comprises at least one of:
a statement about an identification of the at least one substance;
a statement about an authenticity of the at least one substance or a product comprising the at least one substance;
a statement about an origin of the at least one substance;
a statement about a presence or an absence of a state of the at least one substance;
a statement about a property of the at least one substance;
a statement about a property of a component of the at least one substance;
a statement about the stability of a mixture of the at least one substance with at least one another substance;
a statement about a recommended procedure based on a value of the at least one parameter.

Embodiment 10: The communication system according to the preceding Embodiment, wherein the recommended procedure is selected from at least one of:
replacing at least a portion of the at least one substance at a determined point or range of time;
adding a further amount to the at least one substance;
adding a further substance to the at least one substance;
postponing the adding of a further substance to the at least one substance;
removing the at least one substance;
altering at least one of a temperature or a pressure acting on the at least one substance;
performing a harvesting procedure;
postponing a harvesting procedure;
accepting or rejecting at least one object;
recommending or not recommending at least one object;
consuming or not consuming at least one object;
accepting or rejecting at least one object at an input control or an exit control;
sorting a substance in a specific container;
storing at least one object;
cleaning of at least one object.

Embodiment 11: The communication system according to any one of the preceding Embodiments, wherein the third server is designated for providing the treatment data to at least one of a treatment unit or a simulation system.

Embodiment 12: The communication system according to the preceding Embodiment, wherein the treatment unit is selected from at least one of: a storage container, a processing unit, a cleaning unit, a waste container, a valve control unit, a sorting unit, an illumination control unit, a temperature control unit, a pressure control unit, a heating unit, a cooling unit.

Embodiment 13: The communication system according to any one of the preceding Embodiments, wherein the reference spectral information refers to at least one reference sample.

Embodiment 14: The communication system according to any one of the preceding Embodiments, wherein the second server and the third server are integrated into a single unit.

Embodiment 15: A monitoring system for in-situ monitoring of at least one substance, the monitoring system comprising:
- a communication system according to any one of the preceding Embodiments;
- an optical spectrometer designated for
  - acquiring spectral information related to the at least one substance;
  - providing the spectral information to at least one server.

Embodiment 16: The monitoring system according to the preceding Embodiment, wherein the optical spectrometer is designated for providing the spectral information to at least one second server comprised by the communication system.

Embodiment 17: The monitoring system according to any one of the preceding Embodiments referring to the monitoring system, further comprising at least one of:
- at least one light source designated for illuminating at least a portion of the at least one substance;
- an optical probe designated for measuring optical signals related to the at least one substance;
- a first connection between the optical probe and the optical spectrometer designated for guiding the measured optical signals to the optical spectrometer;
- a second connection between the light source and the optical probe designated for guiding light to the at least one substance;
- a data transfer unit designated for connection between the optical spectrometer and the second server.

Embodiment 18: The monitoring system according to the preceding Embodiment, wherein the data transfer unit is designated for providing a wire-bound or a wireless transmission.

Embodiment 19: The monitoring system according to the preceding Embodiment, wherein the data transfer unit is least one of a universal serial bus (USB) or a Bluetooth enabled device.

Embodiment 20: The monitoring system according to any one of the three preceding Embodiments, wherein
- the light source and the optical spectrometer, or
- the optical probe and the optical spectrometer, or
- the light source, the optical probe, and the optical spectrometer are integrated into a single unit.

Embodiment 21: The monitoring system according to any one of the four preceding Embodiments, wherein the second server, the optical spectrometer and the data transfer unit are integrated into a single unit.

Embodiment 22: The monitoring system according to any one of the five preceding Embodiments, wherein at least one of the first connection and the second connection comprises an optical waveguide.

Embodiment 23: The monitoring system according to any one of the six preceding Embodiments, wherein the light source is selected from at least one of an incandescent lamp or a thermal infrared emitter.

Embodiment 24: The monitoring system according to any one of the seven preceding Embodiments, wherein the optical probe comprises at least one of a first tube and a second tube, wherein the first tube is designated for receiving the first connection and the second tube is designated for receiving the second connection.

Embodiment 25: The monitoring system according to the preceding Embodiment, wherein at least one of the first tube and the second tube is a flexible tube.

Embodiment 26: The monitoring system according to any one of the two preceding Embodiments, wherein the at least one tube is attached to at least one mount.

Embodiment 27: The monitoring system according to the preceding Embodiment, wherein the at least one mount is a rigid mount.

Embodiment 28: The monitoring system according to any one of the preceding Embodiments referring to the monitoring system, wherein the optical probe comprises a setup for at least one of a transmittance geometry, a transflexion geometry, a reflection geometry, in particular a diffuse reflection geometry or an attenuated total reflection geometry.

Embodiment 29: The monitoring system according to the preceding Embodiment, wherein the setup for the transmittance geometry is designated for guiding light through a thickness of a layer of the substance of 0.1 mm, preferably of 1 mm, more preferred of 2 mm, to 20 mm, preferably of to 8 mm, more preferred to 5 mm.

Embodiment 30: The monitoring system according to any one of the preceding Embodiments referring to the monitoring system, wherein the optical spectrometer further comprises a dispersive element and at least one detector, in particular a single detector or a detector array.

Embodiment 31: The monitoring system according to the preceding Embodiment, wherein the dispersive element is designated for receiving the light from the at least one substance and separating it into a spectrum of constituent wavelength signals.

Embodiment 32: The monitoring system according to the two preceding Embodiments, wherein the single detector comprises a single radiation sensitive area, or wherein the detector array comprises a plurality of pixelated sensors, wherein each pixelated sensor is adapted to receive at least a portion of one of the constituent wavelength signals, wherein each constituent wavelength signal is related to an intensity of each constituent wavelength, and to generate at least one detector signal.

Embodiment 33: The monitoring system according to the preceding Embodiment, wherein each pixelated sensor comprises a sensor region, wherein each sensor region comprises a radiation sensitive material.

Embodiment 34: The monitoring system according to the preceding Embodiment, wherein the radiation sensitive material is selected from silicon (Si), gallium antimonide (GaSb), germanium (Ge), indium gallium arsenide (InGaAs), indium arsenide (InAs), lead sulfide (PbS), indium antimonide (InSb), lead selenide (PbSe), mercury cadmium telluride (MCT, HgCdTe), triglycine sulfate (TGS), and deuterated triglycine sulfate (DTGS).

Embodiment 35: The monitoring system according to any one of the two preceding Embodiments related to the device, wherein the sensor region is a uniform sensor region.

Embodiment 36: The monitoring system according to any one of the three preceding Embodiments, wherein the pixelated sensor is designated for measuring incident light by generating a sensor signal through measuring an electrical resistance or a conductivity of at least a part of the sensor region.

Embodiment 37: The device according to the preceding Embodiment, wherein the radiation sensitive element is designated for generating the sensor signal by performing at least one current-voltage measurement and/or at least one voltage-current-measurement.

Embodiment 38: The monitoring system according to any one of the preceding Embodiments referring to the monitoring system, wherein at least a portion of a surface of the optical probe is an anti-adhesive surface designated for impeding an adhesion of the at least one substance.

Embodiment 39: The monitoring system according to any one of the preceding Embodiments referring to the monitoring system, wherein the optical probe comprises a sensor designated for determining a physical impact on the at least one substance.

Embodiment 40: The monitoring system according to any one of the preceding Embodiments referring to the monitoring system, wherein the physical impact on the at least one substance is selected from a temperature of the at least one substance or a pressure on the at least one substance.

Embodiment 41: The monitoring system according to any one of the preceding Embodiments referring to the monitoring system, wherein the optical probe comprises an additional sensor designated for measuring additional substance-related information related to the at least one substance.

Embodiment 42: The monitoring system according to the preceding Embodiment, wherein the additional substance-related information is selected from at least one of a temperature, a density, a flux, a conductivity, a viscosity, electromagnetic fields, a dielectric constant, a refractive index, a fluorescence, a phosphorescence, a magnetization value, a pH value, a buffering capacity, an acid value, or a zeta-potential related to the at least one substance.

Embodiment 43: The monitoring system according to any one of the preceding Embodiments referring to the monitoring system, wherein the substance is selected from at least one of a liquid, a gas, a solid body, a powder, a granulate, a bulk material, or a mixture thereof.

Embodiment 44: The monitoring system according to the preceding Embodiments, wherein the solid body is selected from a powder, a granulate, a bulk material, or a mixture thereof.

Embodiment 45: The monitoring system according to any one of the preceding Embodiments referring to the monitoring system, wherein the parameter is selected from at least one of: a regression value, a classification value, a clustering value, a sensory parameter, an extracted feature.

Embodiment 46: A computer-implemented method for operating a communication system, the communication system comprising a cloud server, a first server, at least one second server, and at least one third server, wherein the method comprises the following steps:
  a) providing reference spectral information and reference analytical data from the first server via a first communication interface to the cloud server;
  b) generating a calibration model in the cloud server by using the reference spectral information and the reference analytical data, wherein the calibration model comprises at least one parameter;
  c) providing spectral information from the second server via a second communication interface to the cloud server;
  d) applying the calibration model in the cloud server to the spectral information, whereby at least one value for the at least one parameter is extracted;
  e) providing the at least one value for the at least one parameter to the first server via the first communication interface;
  f) determining treatment data by using the at least one value for the at least one parameter provided by the cloud server to the first server;
  g) providing the treatment data from the first server via a third communication interface to the third server.

Embodiment 47: The method according to the preceding Embodiment, wherein the spectral information is provided directly or indirectly to the cloud server.

Embodiment 48: The method according to the preceding Embodiment, wherein the spectral information is provided indirectly to the cloud server by providing the spectral information to the first server and providing the spectral information from the first server to the cloud server via a fourth communication interface further comprised by the first server.

Embodiment 49: The method according to the preceding Embodiment, wherein the spectral information is provided indirectly to the cloud server by, firstly, providing the spectral information to the first server and, subsequently, providing the spectral information from the first server to the cloud server via a fourth communication interface further comprised by the first server.

Embodiment 50: The method according to any one of the two preceding Embodiments, wherein the calibration model is generated by applying a learning algorithm, preferably selected from a machine-learning algorithm or a deep learning algorithm.

Embodiment 51: The method according to any one of the preceding Embodiments referring to a method, wherein the determining of the treatment data by using the at least one value for the at least one parameter is performed by applying the learning algorithm to a combination of known values for known parameters with known treatment data.

Embodiment 52: A computer-implemented method for in-situ monitoring of at least one substance, wherein the method comprises the following steps:
  (i) acquiring at least one optical reference spectrum of at least one reference sample, wherein each reference sample comprises the at least one substance to be monitored, wherein reference analytical data are assigned to each reference sample, and deriving reference spectral information from the at least one optical reference spectrum;
  (ii) acquiring at least one optical spectrum of the at least one substance in-situ, and deriving spectral information from the at least one optical spectrum;
  (iii) performing the steps of the method according to the preceding Embodiments referring to the computer-implemented method for operating a communication system;
  (iv) treating the at least one substance in accordance with the treatment data.

Embodiment 53: The method according to any one of the preceding Embodiments referring to a method, wherein the at least one optical reference spectrum is acquired by measuring the at least one optical reference sample with a same type of the system for the in-situ monitoring of the at least one substance at at least one of the same temperatures or by adjusting the at least one optical reference spectrum for at least one of known temperature effects or known deviations of the optical spectrometer.

Embodiment 54: The method according to any one of the preceding Embodiments referring to a method, wherein at least one of the optical reference spectrum and the optical spectrum of the at least one substance covers a wavelength from of 250 nm to 6 µm.

Embodiment 55: The method according to any one of the preceding Embodiments referring to a method, wherein the at least one optical spectrum of the at least one substance is repeatedly acquired in-situ while a process involving the at least one substance is in operation.

Embodiment 56: The method according to any one of the preceding Embodiments referring to a method, wherein the treatment data comprise at least one piece of data which is related to a proposed treatment of the at least one substance.

Embodiment 57: The method according to any one of the preceding Embodiments referring to a method, wherein the treatment data comprises at least one of:
- a statement about an identification of the at least one substance;
- a statement about an authenticity of the at least one substance or a product comprising the at least one substance;
- a statement about an origin of the at least one substance;
- a statement about a presence or an absence of a state of the at least one substance;
- a statement about a property of the at least one substance;
- a statement about a property of a component of the at least one substance;
- a statement about the stability of a mixture of the at least one substance with at least one another substance;
- a statement about a recommended procedure based on a value of the at least one parameter.

Embodiment 58: The method according to the preceding Embodiment, wherein the recommended procedure is selected from at least one of:
- replacing at least a portion of the at least one substance at a determined point or range of time;
- adding a further amount to the at least one substance;
- adding a further substance to the at least one substance;
- postponing the adding of a further substance to the at least one substance;
- removing the at least one substance;
- altering at least one of a temperature or a pressure acting on the at least one substance;
- performing a harvesting procedure;
- postponing a harvesting procedure;
- accepting or rejecting at least one object;
- recommending or not recommending at least one object;
- consuming or not consuming at least one object;
- accepting or rejecting at least one object at an input control or an exit control;
- sorting a substance in a specific container;
- storing at least one object;
- cleaning of at least one object.

Embodiment 59: The method according to any one of the preceding Embodiments referring to a method, wherein at least one item of information related to the treatment data is being displayed to a user via a user interface.

Embodiment 60: The method according to any one of the preceding Embodiments referring to a method, wherein the treatment data is being provided to at least one of a treatment unit or a simulation system.

Embodiment 61: The method according to the preceding Embodiment, wherein the treatment unit is selected from at least one of: a storage container, a processing unit, a cleaning unit, a waste container, a valve control unit, a sorting unit, an illumination control unit, a temperature control unit, a pressure control unit, a heating unit, a cooling unit.

Embodiment 62: The method according to any one of the preceding Embodiments referring to a method, wherein the reference spectral information refers to at least one reference sample.

Embodiment 63: A computer program product comprising executable instructions for performing the method steps according to any one of the preceding Embodiments referring to a method.

Embodiment 64: A use of the monitoring system according to any one of the preceding Embodiments referring to the monitoring system for an in-situ monitoring of the at least one substance for a purpose of use selected from the group consisting of: food or beverage control or monitoring, industrial process control, material classification or characterization, product anti-counterfeiting, characterization of living matter, a health application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the Figures.

EXEMPLARY EMBODIMENTS

Figure 1:
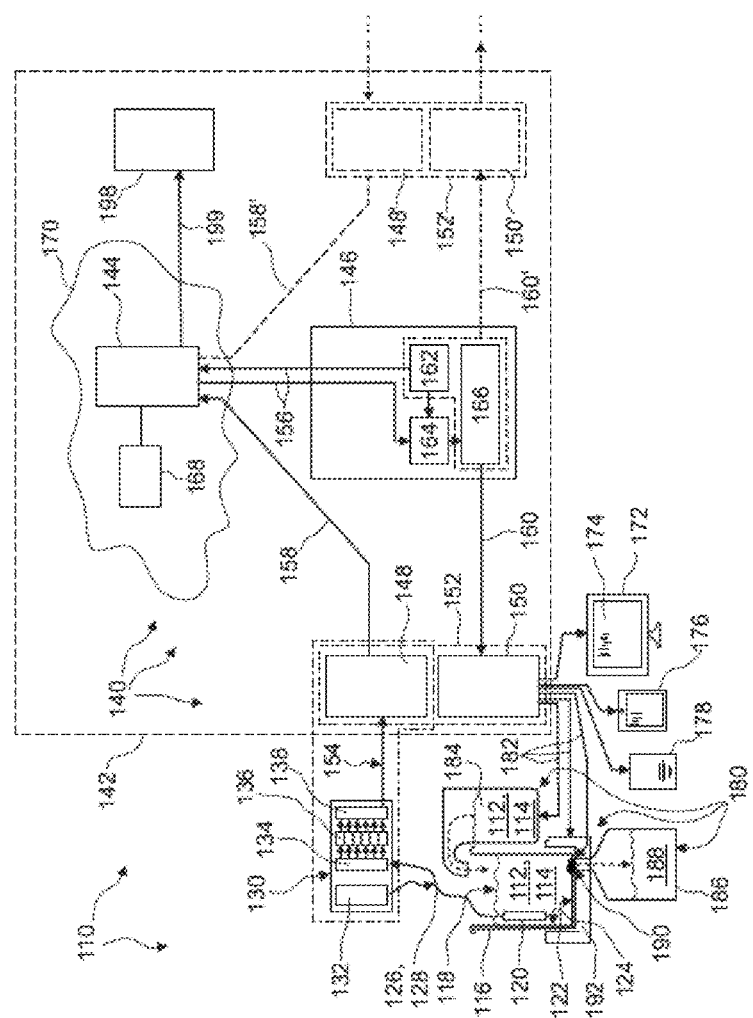
FIG. 1 illustrates a preferred exemplary embodiment of a monitoring system for in-situ monitoring of at least one substance, wherein the monitoring system comprises a communication system and an optical spectrometer, according to the present invention.

FIG. 1 illustrates, in a highly schematic fashion, an exemplary embodiment of a monitoring system 110 for in-situ monitoring of at least one substance 112 according to the present invention. In general, the substance 112 can be assigned to a user who is can be at least one of being responsible for the substance 112 or interesting in receiving treatment data related to the substance 112. As illustrated there, the substance can be an amount of a liquid 114, which can be stored in a receptacle 116, whereby a liquid level 118 within the receptacle 116 can be obtained. Without limiting the scope of the present invention, the liquid 114 as used in this particular example can be a frying oil, which can be used for deep-frying in a procedure of preparing food. However, as indicated above in more detail, various other kinds of substances, in particular further liquids, gases or solid bodies, such as powders, granulates, bulk materials, or a mixture thereof can also be used in relationship with the present invention.

According to the present invention, the monitoring system 110 may further comprise an optical probe 120, which is designated for measuring optical signals that related to the substance 112. As schematically illustrated in FIG. 1, the optical probe 120 can be immersed in the liquid 114, preferably fully below the liquid level 118, within the receptacle 116. In a particular embodiment, the optical probe 120 can be attached to an interior wall 122 of the receptacle 116, preferably close to the bottom 124 of the receptacle 116, thus, avoiding a disturbance of an operation of the liquid 114 as far as possible. For further details concerning the optical probe 120, reference may be made to the description above, to FIG. 3 and to the passages referring thereto. The optical signals which may be measured by the optical probe 120, may, preferably, be guided via a connection 126, which may be a wire-bound connection, such as an optical waveguide 128, or a wireless connection, to the optical spectrometer 130 as further comprised by the monitoring system 110 of the present invention. Alternatively or in addition, the optical spectrometer 130 may be designated for directly acquiring optical signals, specifically by using a setup, preferably, designed for reflection geometry, in particular for diffuse reflection geometry or attenuated reflection geometry (not depicted here).

Accordingly, the optical spectrometer 130 is designated for acquiring spectral information which is related to the substance 112, for which purpose the optical signals as measured by the optical probe 120 or directly acquired by the optical spectrometer 130 may be used. For this purpose, the optical spectrometer 130 may, as further depicted in FIG. 1, comprise at least one light source 132, which is designated for illuminating at least a portion of the substance 112. In particular, the light source 132 may emit electromagnetic radiation which covers at least a portion of the near infrared (NIR) spectral range. In general, the NIR spectral range is considered to cover wavelengths of 780 nm to 2500 nm. However, the light source 132 may also be capable of emitting further wavelengths outside the NIR spectral range, such as the visible spectral range which covers wavelengths of 380 nm to 780 nm, or in other infrared spectral ranges with wavelengths above 2.5 µm, in particular for wavelengths up to 2.6 µm, up to 3.1 µm, up to 3.5 µm, up to 5 µm, up to 5.5 µm, up to 6 µm, up to 20 µm, or up to 40 µm.

For a purpose of the generating the desired radiation, the light source 132 may, preferably, comprise an incandescent lamp having a metal of a low electrical conductivity, specifically selected from at least one of tungsten or NiCr, or a graphite, provided in form of a filament or a film. Herein, the filament or the film can be impinged by an electrical current in a fashion that a heating thereof filament results in an emission of photons over a considerably wide spectral range which, in particular, includes the NIR spectral range. As an alternative, other kinds of thermal radiation sources, specifically a thermal infrared emitter as described above in more detail, may also be used. However, a different light source 132 may also be feasible.

As already indicated above, the light source 132 may be a continuous light source or, as an alternative a pulsed light source, wherein the pulsed light source may have a modulation frequency of at least 1 Hz, of at least 5 Hz, of at least 10 Hz, of at least 50 Hz, of at least 100 Hz, of at least 500 Hz, of at least 1 kHz, or more. As a result, the modulation frequency neatly fits with a range of detectivity of infrared sensors which are particularly sensitive at 500 Hz or above, especially due to a strong impact of 1/f noise. For this purpose, comprehensive and expensive radiation generators which are based on semiconductors, such as light-emitting diodes, or lasers, specifically quantum cascade lasers, can be used. A cheap alternative can be provided by a mechanical chopper wheel or by using pulsable infrared sources comprising a low thermal-mass filament of Tungsten or NiCr. By way of example, such kind of pulsable infrared sources is available from Helioworks' EP-Series or EF-Series (refer to www.helioworks.com), or as FLIR from ICx Photonics (refer to www. amstechnologies.com/fileadmin/amsmedia/downloads/2533_IR_Broadband_Sources.pdf). As a further alternative, a device for generating radiation as disclosed in European patent application 19 21 32 77.7, filed Dec. 3, 2019, as described above in more detail, can also be used.

As further illustrated in FIG. 1, the light emitted by the light source 132 can be guided towards the optical probe 120 by using the same connection 126, preferably comprising the same optical waveguide 128, or a different connection (not depicted here) which can be arranged between the light source 132 and the optical probe 120. As depicted below in FIG. 3 in more detail, the connection 126 can be provided in a branched form, wherein a first branch can be used for providing the light as generated by the light source 132 to the optical probe 120 while a second branch can be used for guiding the light received from the optical probe 120, which has, in general, been modified by the substance 112 under monitoring, to the optical spectrometer 130.

For this purpose, the optical spectrometer 130 may further comprise a dispersive element 134, which is designated for receiving the light from the substance 112 and separating it into a spectrum of constituent wavelength signals, and a detector array 136 which may comprise a plurality of pixelated sensors, wherein each pixelated sensor is adapted to receive at least a portion of one of the constituent wavelength signals, wherein each constituent wavelength signal is related to an intensity of each constituent wavelength, and to generate at least one detector signal. As an alternative, a single detector having a single radiation sensitive area may also be feasible.

Herein, the dispersive element 134 is used in the optical spectrometer 130 for separating the light received from the substance 112 into a spectrum of constituent wavelength signals such that only a single wavelength or a narrow wavelength range may impinge on at least one, preferably exactly one, pixelated sensor as comprised by the detector array 136, wherein respective intensities or amplitudes are determined. As described above in more detail, the dispersive element 134 may be diffractive element or an interferometric element, wherein the diffractive element may be a prism or an optical grating, while the interferometric element may be an interference filter, in particular a bandpass filter, a band rejection filter, a Bragg filter, a length variable filter, such as a linearly variable filter, a Fabry-Perot interferometer or a Michelson interferometer. As an alternative, the optical spectrometer 130 may comprise at least one Fourier-transform infrared spectroscopy (FTIR) spectrophotometer, wherein, the optical spectrometer 130 may comprise at least one broadband light source and at least one interferometric element, such as a Michelson interferometer. The FTIR spectrophotometer may be configured for illuminating the object with at least one light beam having a time-dependent spectrum. Preferably, the FTIR spectrophotometer may comprise at least one moving mirror element, wherein by movement of the mirror element a light beam generated by the broadband light source 132 can be alternatingly be blocked and transmitted by the interferometric element. The optical spectrometer may, furthermore, comprise at least one microelectromechanical system (MEMS) being configured for controlling the mirror element. Further, the FTIR spectrophotometer may be configured for modulating the light beam depending on the wavelength such that different wavelengths are modulated at different rates.

Further, each pixelated sensor as comprised by the detector array 136 may comprise a uniform sensor region designated for receiving the light from the substance 112 and split into a spectrum of constituent wavelength signals by the dispersive element 134 in a manner that a generation of at least one detector signal may be triggered. Preferentially, the generation of the at least one detector signal may be governed by a defined relationship between the detector signal and the manner of the illumination of the sensor region. Herein, the sensor region may have a size of 10 mm×1 mm or less, preferred of 2 mm×0.2 mm or less, more preferred of 1 mm×0.1 mm or less, most preferred of 0.5 mm×0.05 mm or less. For a purpose of generating the at least one detector signal upon illumination, the sensor region may comprise a radiation sensitive material which can, preferably be selected from silicon (Si), in particular for wavelengths up to 1.1 µm. For wavelengths above 1.1 µm, the radiation sensitive material may be selected from at least one of gallium antimonide (GaSb), in particular for wavelengths up to 1.7 µm; germanium (Ge), in particular for wavelengths up to 1.85 µm; indium gallium arsenide (InGaAs), in particular for wavelengths up to 2.5 µm; indium arsenide (InAs), in particular for wavelengths up to 3.5 µm; lead sulfide (PbS), in particular for wavelengths up to 3.5 µm; indium antimonide (InSb), in particular for wavelengths up to 5.5 µm; lead selenide (PbSe), in particular for wavelengths up to 6 µm; mercury cadmium telluride (MCT, HgCdTe), in particular for wavelengths up 20 µm, triglycine sulfate (TGS), for wavelengths up to 40 µm, and of deuterated triglycine sulfate (DTGS), for wavelengths up to 40 µm. However, other materials may also be feasible for being used in the detector array 136.

As further depicted in FIG. 1, the optical spectrometer 130 comprises an internal evaluation unit 138, which is designated for determining the desired spectral information by evaluating the detector signals provided by the detector array 136. However, the evaluation unit 138 could also be provided as a further unit separated from the optical spectrometer 130. As defined above, the term "evaluation unit" refers to a device which is configured to determine the desired spectral information related to the substance 112 of which a spectrum has been recorded, wherein the spectral information can be obtained by evaluating the detector signals as provided by the detector array 136.

In addition, the optical spectrometer 130 may comprise further elements not depicted here. In particular, at least one transfer element (not depicted here) may be used, wherein the transfer element is designed for receiving the light from substance 112, e.g. by using the optical probe 120 via the connection 126, preferably from the optical waveguide 128, and transferring it to the dispersive element 134, thereby, preferably, concentrating the light onto the dispersive element 134. Examples of preferred transfer elements can be found in WO 2019/115594 A1, WO 2019/115595 A1, or WO 2019/115596 A1.

According to the present invention, the monitoring system 110 further comprises a communication system 140 as, which is, schematically, indicated in FIG. 1 by a content comprised by the long dashed lines 142. As illustrated there, the communication system 140 comprises a cloud server 144, a first server 146, a second server 148, and a third server 150. As further depicted there, the communication system 140 may, further, comprise one or more further second servers 148' and one or more further third server 150', wherein a number of the second servers 148, 148', generally, equals the number of the third servers 150, 150'. As indicated by the short dashed lines, a common server 152, 152', which may perform the tasks of both a second server 148, 148' and a corresponding third server 150, 150', can be provided as a single unit.

As already indicated above, each server 144, 146, 148, 150 is, in particular accordance with the present invention, configured to play a decisive role, thus, allowing a processing of the spectral information acquired by the optical spectrometer 130 to be distributed between the different servers 144, 146, 148, 150 in a particular fashion as described herein. As a result thereof, whereas the spectral information used for the monitoring of the substance 112 is provided by the user, the processing of the spectral information is performed by a first instance being familiar with an evaluation of the spectral information, and the treatment data as desired by the user is generated by a second instance being familiar therewith. Consequently, the communication system 140 is, thus, capable of providing both distributed best practice with regard to the evaluation of the spectral information and, at the same time, a specific exchange of data under high data protection standards during the processing of the spectral information within a, preferably fully, automatic procedure designated for generating the desired treatment data and to providing them to the user.

The spectral information which can be used for monitoring the substance 112 can, preferably, be provided by a data transfer unit 154 to the second server 148. Herein, the data transfer unit 154 may be designated for transmitting the spectral information from the optical spectrometer 130 to the second server 148 in a wire-bound or a wireless transmission. For this purpose, the data transfer unit 154 can, preferably, be selected from at least one of a universal serial bus (USB) or a Bluetooth enabled device. As further shown in FIG. 1, the optical spectrometer 130, the data transfer unit 154 and the second server 148, can, as schematically indicated by a dotdashed line, also be integrated into a single unit. However, other embodiments may also be feasible.

As schematically illustrated in FIG. 1, the first server 146 further has a first communication interface 156, which is configured to provide reference spectral information which refers to at least one reference sample and reference analytical data to the cloud server 144. As described above and below in more detail, the reference spectral information and the reference analytical data are used by the cloud server 144 in order to generate a calibration model, wherein the calibration model is arranged in a fashion that it comprises at least one parameter. Further, each second server 148, 148' has at least one second communication interface 158, 158', wherein each second communication interface 158, 158' may be configured, as schematically illustrated in FIG. 1, to directly provide spectral information to the cloud server 144. An alternative configuration for a communication path with respect to the second communication interface 158, 158' is displayed in FIG. 2. As described above and below in more detail, the calibration model which is maintained at the cloud server 144 is applied to the spectral information, whereby at least one value for the at least one parameter is extracted. Further, the at least one value for the at least one parameter is provided to the first server 146 by using the first communication interface 156. As described above and below in more detail, the first server 146 is further configured to determine treatment data by using the at least one value for the at least one parameter as provided by the cloud server 144 via the first communication interface 156. Further, the first server 146 further has at least one third communication interface 160, 160' wherein each third communication interface 160, 160' is configured to provide the treatment data to the at least one third server 150, 150'. Herein, any one of the communication interfaces 156, 158, 158', 160, 160' may, preferably, be provided in a wireless fashion; however, a wire-bound communication may also be feasible.

For the purposes of the present invention, the first server 146 may comprise a first data storage device 162, wherein the first data storage device 162 may be configured to store the reference spectral information which refers to the at least one reference sample and the reference analytical data for being provided to the cloud server 144 via the first communication interface 156 and, independently, to a first processing unit 164 further comprised by the first server 146. Further, the first server 146 may comprise a second data storage device 166, wherein the second data storage device 166 may be configured to store the treatment data for being provided to the at least one third server 150, 150'. Further, the first processing unit 164 as comprised by the first server 146 may be configured to generate the treatment data by using the reference spectral information and the reference analytical data as provided by the first data storage device 162 as well as the at least one value for the at least one parameter as provided by the cloud server 144 via the first communication interface 156. Herein, the first data storage device 162 and the second data storage device 166 may be comprised by a single data storage device as indicated by the dashed lines in FIG. 1. However, further arrangements of the first server 146 may also be conceivable.

Further, the cloud server 144 and, optionally at least one cloud data storage device 168, may be available on demand in a cloud 170 as schematically depicted in FIG. 1. In addition, one or more further devices may also contribute to the infrastructure of the cloud 170. As generally, the cloud server 144 and the optional cloud data storage device 168 may, thus, provide computing power and data storage capacities, respectively, without requiring a direct active management by the user or an operator of the first server 146 or the second servers 148, 148'.

Based on the infrastructure as depicted in FIG. 1, the cloud server 144 to be used by the present invention is configured to generate the calibration model by using the reference spectral information which refers to the at least one reference sample and the reference analytical data as provided by the first server 146, wherein the calibration model comprises at least one parameter;

apply the calibration model to the spectral information as provided by the first server 146, whereby the at least one value for the at least one parameter is extracted; and provide the at least one value for the at least one parameter to the first server 146 via the first communication interface 156.

For this purpose, a service provider who may be a different person and/or entity may be capable of providing a structure of the calibration model. A indicated above, the calibration model has a structure which comprises one or more parameters on which the calibration model may be based. As described above in more detail, the at least one parameter may be selected from a regression value, a classification value, a clustering value, a sensory parameter, an extracted feature.

As further schematically depicted in FIG. 1, the third server 150 can drive a monitor 172, which may act as a user interface designated for displaying at least one item of information 174, which is related to the treatment data, to the user. Herein, the item of information 174 may be plain text, such as "remove oil", "refill oil" or a graphic symbol representing this kind of information. As further illustrated there, the monitor 172 can be directly driven by the third server 150; however, the monitor 172 may also be comprised by a personal computer, which may receive the item of information 174 by the server 150. Alternatively or in addition, a mobile communication device 176, preferably selected from at least one of a smartphone, a tablet, or a personal digital assistant, may be used, wherein the mobile communication device comprises a display which can be configured to provide the at least one item of information 174 to the user, such as by applying a specific application ("app") configured for this purpose. Alternatively or in addition, a voice output device, such as at least one loudspeaker 178, may be used for providing the at least one item of information 174 to the user.

Alternatively or in addition, the third server 150 may be designated for providing the treatment data directly, such as via wire-bound or a wireless connection 182, or indirectly, such as via a further processing device (not depicted here), to a treatment unit 180. As schematically depicted in FIG. 1, the treatment unit 180 may comprise at least one of a storage container 184, which can be designated for stocking a further amount of the liquid 114 and being capable of providing a portion thereof to the receptacle 116, such as indicated by a dotted arrow;

a waste container 186, which can be designated for receiving used liquid 188 from the receptacle, such as indicated by a further dotted arrow, for example, by providing an opening signal to a valve 190;

a temperature control unit 192, which can be designated for being capable of altering a temperature of the liquid 114 as comprised by the receptacle 116, in particular by cooling or heating the liquid 114, such as through the wall 122 and/or the bottom 124 of the receptacle 116, in order to change a property of the liquid 114, for example a viscosity of the liquid 114.

However, further kinds of treatment units 180, such as those indicated in the description above or others, may also be conceivable.

Alternatively or in addition, the third server 150 may be designated for providing the treatment data to at least one simulation system (not depicted here), wherein the simulation system may be comprised by at least one of the third server 150 or a further processing device (not depicted here). For further details with regard to the simulation system, reference can be made to the description above.

As further depicted in FIG. 1, an additional server 198 can, together with an additional interface 199, be used for generating and maintaining the infrastructure within the cloud server 144 as indicated in FIG. 1 which is designated for performing the operations within the cloud server 144 of generating the calibration model by using the reference spectral information which refers to the at least one reference sample and the reference analytical data as provided by the first server 146, of applying the calibration model to the spectral information as provided by the second server 148, 148', thereby extracting the at least one value for the at least one parameter, and of providing the at least one value for the at least one parameter to the first server 146 via the first communication interface 156.

Figure 2:
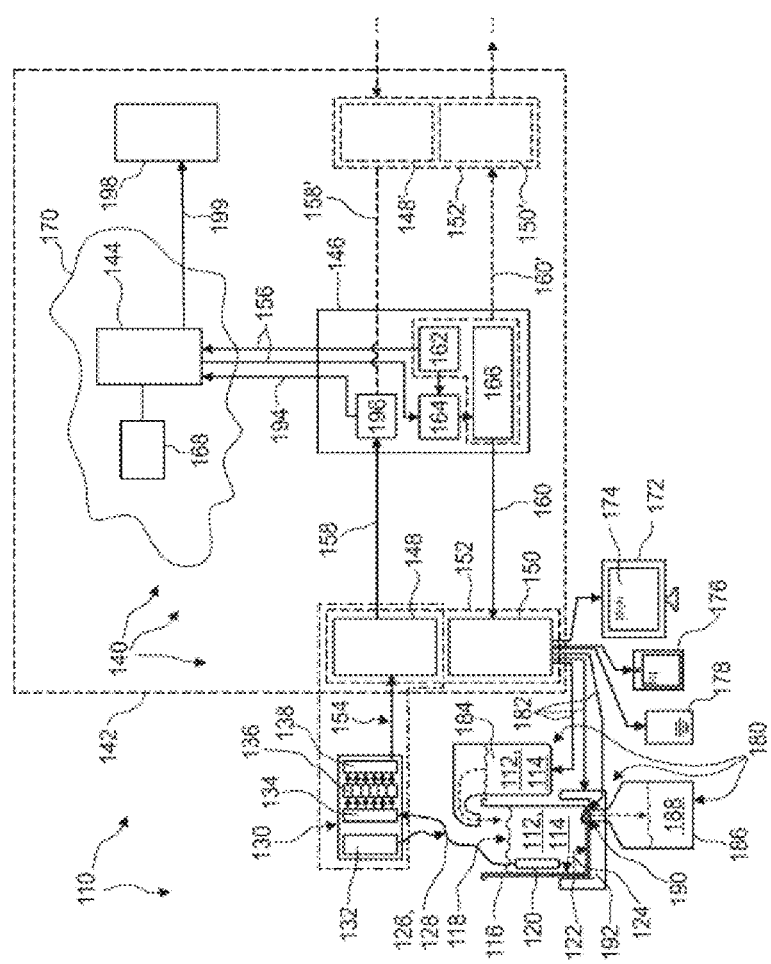
FIG. 2 illustrates a further preferred exemplary embodiment of the monitoring system for the in-situ monitoring of the at least one substance, wherein the monitoring system comprises the communication system and the optical spectrometer, according to the present invention.

As indicated above, FIG. 2 illustrates an alternative configuration for a communication path with respect to the second communication interface 158, 158'. In this further preferred embodiment of the monitoring system 110 according to the present invention, which comprises the alternative configuration for the communication system 140, each second communication interface 158, 158' as comprised by each second server 148, 148' may be configured, as schematically illustrated in FIG. 2, to indirectly provide the spectral information to the cloud server 144. For this purpose, each second communication interface 158, 158' may be directed to the first server 146 which, in this preferred embodiment, may be configured to receive the spectral information from each second communication interface 158, 158' and to provide it to the cloud server 144 by using a fourth communication interface 194, which can be configured to, subsequently, provide the spectral information to the cloud server 144.

Herein, the spectral information may simply be redirected it to the fourth communication interface 194 without exerting any application to the spectral information. However, as further depicted in FIG. 2, the first server 146 may, in addition, comprise a second processing unit 196 which may be configured to alter the spectral information in a fashion as described above in more detail.

For further details with respect to the further embodiment of the monitoring system 110, in particular of the communication system 140 as schematically depicted in FIG. 2, reference may be made to the description of the embodiment as illustrated in FIG. 1 and described above.

Figure 3:
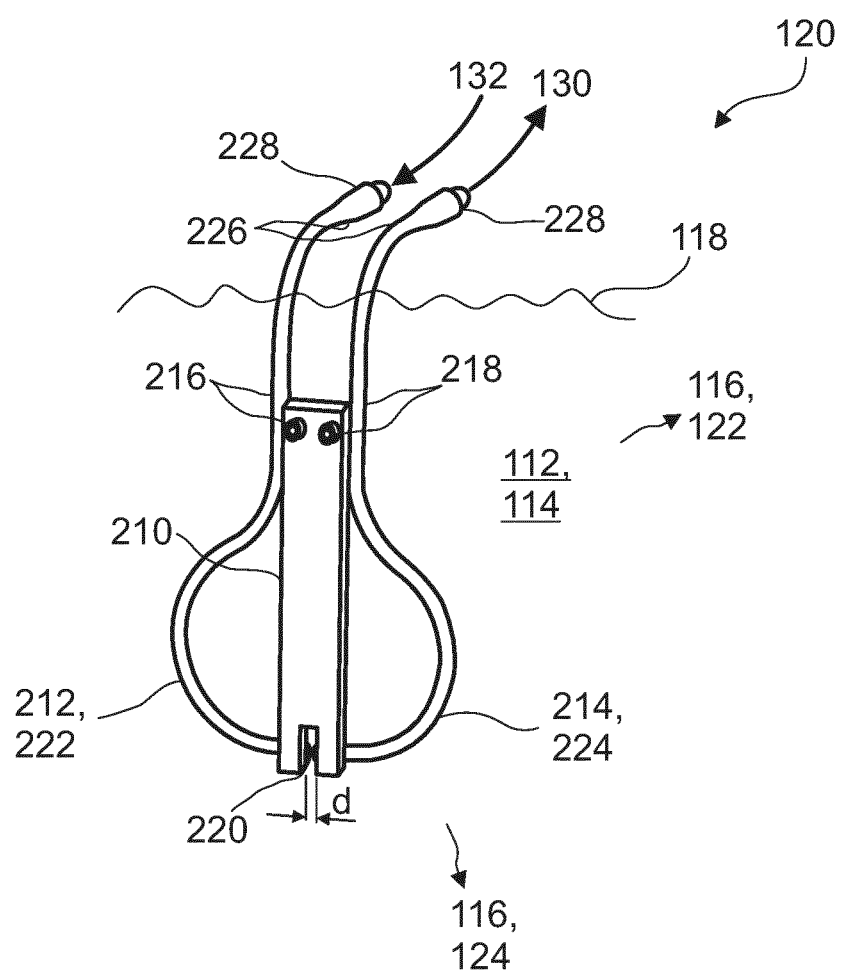
FIG. 3 illustrates a preferred exemplary embodiment of an optical probe designated for measuring optical signals related to the at least one substance as optionally comprised by the optical spectrometer.

FIG. 3 illustrates a preferred exemplary embodiment of the optical probe 120, which is designated for measuring optical signals that are related to the substance 112. As schematically depicted there, the optical probe 120 may comprise a mount 210 to which a first tube 212 and a second tube 214 are attached. For this purpose, screws 216, 218 may be used. However, other kinds of attachment may also be feasible. Herein, the mount 210 may, preferably, be a rigid mount, thus, being capable of providing a desired stability to the optical probe 120, while at least one of the tubes 212, 214 may, preferably, be a flexible tube, thus, providing a certain level of flexibility to the tubes 212, 214 that can be used in a harsh environment, such as in a liquid 1 14, in particular in hot frying oil, or in a volume comprising powders, granulates or bulk materials, in order to reduce a danger of damage. By way of example, it may be advantageous to design the optical probe 120 in a fashion that an obstruction of the light due to a polymerized oil build-up, particles resulting from fried food or other sources, or bubbles of steam created from the fried food or other sources, could be avoided as far as possible.

Alternatively or in addition, the optical probe 120 may comprise a cover having selected properties which may be capable of increasing a life-time of the optical probe 120 within a harsh environment. In particular, a surface of the optical probe 120 or at least a portion thereof, in particular of the tube 212, 214, may be an anti-adhesive surface, which can, preferably, be designated for impeding an adhesion of the substance 112, such as the liquid 114, in particular the hot frying oil or one or more degradation products thereof, on the surface of the optical probe 120. For this purpose, a fluoropolymer coating, such as a polytetrafluoroethylene (Teflon®) which is preferred due to its favorable transparency in the NIR region, or fluorinated (poly)-silanes; a polyamide coating such as Kevlar®; a ceramic coating; or a (super) hydrophobic coating, such as described by John T. Simpson et al. Rep. Prog. Phys. 78, 086501, 2015, may, preferably, be used. However, different kinds of covers may also be conceivable.

In a preferred embodiment, the optical probe 120 may comprise a setup which can be used for an optical measurement in at least one of a transmittance, a transflexion or a reflection geometry. As shown in FIG. 3, the transmittance geometry may, especially, be preferred in case the substance 112 to be monitored comprises the at least one of a liquid 114, specifically a frying oil, a gas, a powder, or a granulate. Herein, the setup for the transmittance geometry can, preferably, be designated for guiding light through a thickness d of a layer of the substance 112 to be monitored, in particular of 0.5 mm, preferably of 1 mm, more preferred of 2 mm, to 20 mm, preferably of to 8 mm, more preferred to 5 mm. In the exemplary embodiment of FIG. 3, a location of optical measurement is provided by a gap 220 in the mount 210, which defines the thickness of the layer of the substance 112 to be monitored. However, in case the substance 112 to be monitored comprises a bulk material, a reflection geometry, such as an attenuated total reflection geometry, may be more preferred.

In the preferred embodiment as depicted in FIG. 3, the setup for the optical probe 120, which is designated for the optical measurement in the transmittance geometry, the first tube 212 is designated for receiving a first connection 222 while the second tube 214 is designated for receiving a second connection 224. Herein, the first connection 222 is provided between the location of the optical measurement and the optical spectrometer 130 in order to guide the optical signals, which are measured by the optical probe 120 at the location of the optical measurement, while the second connection 224 is provided between the light source 132 and the location of the optical measurement in order to guide the light to the location of the optical measurement. Herein, the connections 222, 224 may, preferably, be a wire-bound connection, especially optical waveguides, however, a wireless connection can, alternatively or in addition, also be used. The connections 222, 224 may be attached to a branch of the connection 126 as mentioned above in connection with in FIGS. 1 and 2 by using an adapted sealing 226 and a corresponding coupling 228 as exemplarily illustrated in FIG. 3. However, further kinds of attachments may also be conceivable.

In addition, the optical probe 120 may comprise an additional sensor (not depicted here), which may be designated for which may be designated for measuring additional substance-related information of the at least one substance 112 further related thereto in addition to the at least one piece of information about the at least one substance 112 which is acquired by using the optical spectrometer 130. Herein, the further substance-related information may, preferably, be selected from at least one of: a temperature, a density, a flux, a conductivity, a viscosity, electromagnetic fields, a dielectric constant, a refractive index, a fluorescence, a phosphorescence, a magnetization value, a pH Value, a buffering capacity, an acid value, or a zeta-potential. However, further kinds of additional substance-related information may also be feasible. Herein, the additional sensor may, preferably, be attached to the mount 210, wherein leads for a power supply or a data read-out could, preferably, be guided via at least one of the first tube 212 and the second tube 214. In addition, further elements which can be attached to the optical probe 120 are conceivable.

It is indicated here that, apart from the preferred exemplary embodiments of the monitoring system 110 according to the present invention as shown in FIG. 1 or 2, further embodiments of the monitoring system 110 may also be conceivable.

Figure 4:
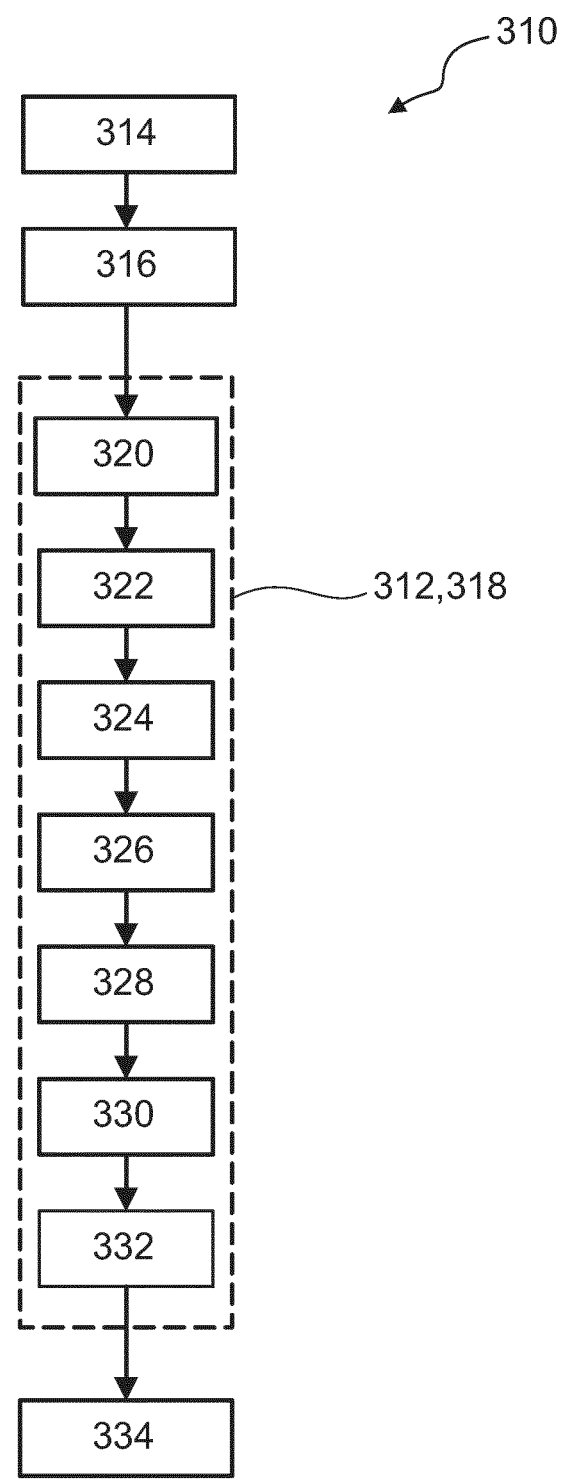
FIG. 4 illustrates a diagram indicating a preferred exemplary embodiment of a computer-implemented method for the in-situ monitoring of the at least one substance, wherein the method comprises a method for operating the communication system.

FIG. 4 illustrates, in a highly schematic fashion, a computer-implemented method 310 for an in-situ monitoring of the substance 112, wherein the method 310 for the in-situ monitoring of the substance 112 comprises the steps of a computer-implemented method 312 for operating the communication system 140.

In a reference acquisition step 314 according to step (i), at least one optical reference spectrum of at least one reference sample is acquired. As described above in more detail, each reference sample comprises the substance 112 to be monitored, wherein the reference analytical data are assigned to each reference sample. For this purpose, the at least one optical reference spectrum can, in particular, be acquired by measuring the at least one optical reference sample with a same type of the system 110 for the in-situ monitoring of the substance 112, preferably at the same the same temperatures. As an alternative, the at least one optical reference spectrum can be adjusted for at least one of known temperature effects or known deviations of at least one of the optical spectrometer 130 or the optical probe 120. Further, the reference spectral information is derived in the reference acquisition step 314 from the at least one optical reference spectrum of at least one reference sample and, preferably, stored together with the reference analytical data in the first data storage device 162 of the first server 146 for being provided to the cloud server 144 via the first communication interface 156.

In an acquisition step 316 according to step (ii), at least one optical spectrum of the substance 112 is acquired in-situ by the optical spectrometer 130, preferably by using the optical probe 120, as described above in more detail. Herein, the desired spectral information is derived from the at least one optical spectrum of the substance 112.

In an operation step 318 according to step (iii), the steps of the method 312 for operating the communication system 140, preferably for operating the communication system 140 as described above in more detail, are performed.

Herein, in a referencing step 320 according to step a), the reference spectral information which refers to the at least one reference sample and reference analytical data as provided by the first server 146 are guided, as described above in more detail, via the first communication interface 156 to the cloud server 144. As indicated above, at least one of the cloud server 144 or the at least one cloud data storage device 168 could be used as data storage capacities for storing the reference spectral information and reference analytical data, in particular for later use in the following step b).

In a calibrating step 322 according to step b), a calibration model is generated in the cloud server 144 by using the reference spectral information which refers to the at least one reference sample and the reference analytical data as being provided to the cloud server 144 in the referencing step 320. As described above in more detail, the calibration model comprises at least one parameter both of which can, preferably, be determined by using the computing power as provided by the cloud server 144 and, if required, be stored in at least one of the cloud server 144 or the at least one cloud data storage device 168, in particular for late use in the following step c).

In a providing step 324 according to step c), the spectral information is provided from the at least one second server 158, 158' to the cloud server 144. As described above in more detail, the spectral information is provided by each second server 148, 148', from where it may be guided to the cloud server 144 on a direct route via the at least one second communication interface 158, 158' as schematically depicted in FIG. 1, or on an indirect route involving the at least one second communication interface 158, 158', the first server 146, and the fourth communication interface 194 as schematically depicted in FIG. 2. In the indirect route, the spectral information may pass the first server 146 with or without exerting any application to the spectral information. As already described above, the spectral information can, preferably, be stored in the cloud server 144, in particular for immediate use in the following step d). However, the spectral information may also be stored in the at least one cloud data storage device 168.

In a parametrization step 326 according to step d), the calibration model is applied in the cloud server 144 to the spectral information. In this manner, at least one value for the at least one parameter is extracted from the particular spectral information, preferably by using the computing power as provided by the cloud server 144, for which purpose the reference spectral information which refers to the at least one reference sample and the reference analytical data, which are stored in at least one of the cloud server 144 or, preferably, the at least one cloud data storage device 168, are used. Preferably, the at least one parameter as extracted from the particular spectral information, may be stored in the cloud server 144, in particular for immediate use in the following step e).

In a supplying step 328 according to step e), the at least one value for the at least one parameter is supplied, preferably directly from the cloud server 144, to the first server 146 by using the first communication interface 156. As already indicated above, the first server 146 may, preferably, comprise the first processing unit 164, where the at least one value for the at least one parameter can, preferably, be stored, in particular for immediate use in the following step f).

In a determining step 330 according to step f), treatment data is determined, preferably in the first server 146, by using the at least one value for the at least one parameter as provided by the cloud server 144 to the first server 146 via the first communication interface 156 and, preferably, the reference spectral information which refers to the at least one reference sample and the reference analytical data as provided by the first data storage device 162. For this purpose, the first processing unit 164 may, preferably, be used as already indicated above in more detail.

In an information step 332 according to step g), the treatment data are provided from the first server 146 via the at least one third communication interface 160, 160' to the at least one third server 150, 150'. For this purpose, the at least one third server 150, 150' can drive the monitor 172, which may act as the user interface designated for displaying the at least one item of information 174 related to the treatment data to the user. Alternatively or in addition, the mobile communication device 176 may act as the user interface. Alternatively or in addition, the loudspeaker 178 may provide the at least one item of information 174 to the user in an acoustic manner. Alternatively or in addition, the at least one third server 150, 150' may be designated for providing the treatment data to a treatment unit 180 as described above in more detail, such as schematically depicted in FIGS. 1 and 2. Alternatively or in addition, the at least one third server 150, 150' may be designated for providing the treatment data to at least one simulation system as further described above.

In a treatment step 334 according to step (iv), the substance 112 is, thus, treated in accordance with the treatment data by at least one of the user or the treatment unit 180.

LIST OF REFERENCE NUMBERS 110 monitoring system
112 substance 114 liquid
116 receptacle
118 liquid level
120 optical probe
122 wall
124 bottom
126 connection
128 optical waveguide
130 optical spectrometer
132 light source
134 dispersive element
136 detector array
138 evaluation unit
140 communication system
142 long dashed lines
144 could server
146 first server
148 second server
150 third server
152 pair
154 data transfer unit
156 first communication interface
158 second communication interface
160 third communication interface
162 first data storage device
164 first processing unit
166 second data storage device
168 cloud data storage device
170 cloud
172 monitor
174 item of information
176 mobile communication device
178 loudspeaker
180 treatment unit
182 connection
184 storage container
186 waste container
188 used liquid
190 valve
192 temperature control unit
194 fourth communication interface
196 second processing unit
198 additional server
199 additional interface
210 mount
212 first tube
214 second tube
216 screw
218 screw
220 gap
222 first connection
224 second connection
226 sealing
228 coupling
310 computer-implemented method for an in-situ monitoring of the substance
312 computer-implemented method for operating the communication system
314 reference acquisition step
316 acquisition step
318 operation step
320 referencing step
322 calibrating step
324 providing step
326 parametrization step
328 supplying step
330 determining step
332 information step
334 treatment step

The invention claimed is:

1. A communication system, the communication system comprising a cloud server, a first server, at least one second server, and at least one third server, each server respectively comprising at least one processor and at least one memory device storing instructions that, when executed by the corresponding at least one processor, cause the at least one processor to perform operations according to the stored instructions;

wherein the first server further comprises a first communication interface configured to provide reference spectral information referring to at least one reference sample and reference analytical data to the cloud server;

wherein each second server further comprises a second communication interface configured to provide spectral information related to at least one substance to the cloud server;

wherein the cloud server is configured to;
generate a calibration model by using the reference spectral information referring to the at least one reference sample and the reference analytical data provided by the first server, wherein the calibration model comprises at least one parameter;
apply the calibration model to the spectral information related to the at least one substance provided by the second server, whereby at least one value for the at least one parameter is extracted; and
provide the at least one value for the at least one parameter to the first server via the first communication interface;

wherein the first server is configured to determine treatment data by using the at least one value for the at least one parameter provided by the cloud server, wherein the treatment data comprise at least one piece of data which is related to a proposed treatment of the at least one substance; and wherein the first server further comprises at least one third communication interface, and wherein each third communication interface is configured to provide the treatment data to the at least one third server to initiate treating the at least one substance in accordance with the treatment data.

2. The communication system according to claim 1, wherein the second communication interface is configured to provide the spectral information directly or indirectly to the cloud server, wherein the spectral information is provided indirectly to the cloud server by providing the spectral information to the first server, and wherein the first server further comprises a fourth communication interface configured to provide the spectral information from the first server to the cloud server.

3. The communication system according to claim 1, wherein the third server comprises or drives a user interface designated for displaying at least one item of information related to the treatment data to a user for the treating of the at least one substance in accordance with the treatment data.

4. The communication system according claim 1, wherein the third server is designated for providing the treatment data to at least one of a treatment unit or a simulation system for the treating of the at least one substance in accordance with the treatment data.

5. The communication system according to claim 1, wherein the second server and the third server are integrated into a single unit.

6. A monitoring system for in-situ monitoring of at least one substance, the monitoring system comprising:
the communication system according to claim 1; and
an optical spectrometer designated for
acquiring spectral information related to the at least one substance; and
providing the spectral information to at least one server.

7. The monitoring system according to claim 6, wherein the optical spectrometer is designated for providing the spectral information related to the at least one substance to at least one second server comprised by the communication system.

8. The monitoring system according to claim 6, further comprising at least one of:
at least one light source designated for illuminating at least a portion of the at least one substance;
an optical probe designated for measuring optical signals related to the at least one substance;
a first connection between the optical probe and the optical spectrometer designated for guiding the measured optical signals to the optical spectrometer;
a second connection between the at least one light source and the optical probe designated for guiding light to the optical probe; and
a data transfer unit designated for connection between the optical spectrometer and at least one second server comprised by the communication system.

9. The monitoring system according to claim 8, wherein the second server, the optical spectrometer and the data transfer unit are integrated into a single unit.

10. The monitoring system according to claim 8, wherein at least one of the first connection and the second connection comprises an optical waveguide.

11. The monitoring system according to claim 8, wherein the optical probe comprises a setup for at least one of a transmittance geometry, a transflexion geometry, or a reflection geometry.

12. A computer-implemented method for operating a communication system, the communication system comprising a cloud server, a first server, at least one second server, and at least one third server, wherein the method comprises the following steps:
a) providing reference spectral information referring to at least one reference sample and reference analytical data from the first server via a first communication interface to the cloud server,
b) generating a calibration model in the cloud server by using the reference spectral information referring to the at least one reference sample and the reference analytical data, wherein the calibration model comprises at least one parameter;
c) providing spectral information related to at least one substance from the second server via a second communication interface to the cloud server;
d) applying the calibration model in the cloud server to the spectral information related to the at least one substance, whereby at least one value for the at least one parameter is extracted;
e) providing the at least one value for the at least one parameter to the first server via the first communication interface;
f) determining treatment data by using the at least one value for the at least one parameter provided by the cloud server to the first server, wherein the treatment data comprise at least one piece of data which is related to a proposed treatment of the at least one substance;
g) providing the treatment data from the first server via a third communication interface to the third server; and
h) treating the at least one substance in accordance with the treatment data.

13. The method according to claim 12, wherein the spectral information is provided directly or indirectly to the cloud server, and wherein the spectral information is provided indirectly to the cloud server by providing the spectral information to the first server and providing the spectral information from the first server to the cloud server via a fourth communication interface further comprised by the first server.

14. A computer-implemented method for in-situ monitoring of at least one substance, wherein the method comprises the following steps:
(i) acquiring at least one optical reference spectrum of at least one reference sample, wherein each reference sample comprises the at least one substance to be monitored, wherein reference analytical data are assigned to each reference sample, and deriving reference spectral information referring to the at least one reference sample from the at least one optical reference spectrum;
(ii) acquiring at least one optical spectrum of the at least one substance in-situ, and deriving spectral information related to the at least one substance in-situ from the at least one optical spectrum; and
(iii) performing the steps of the method according to claim 12 referring to the computer-implemented method for operating a communication system to determine treatment data.

15. The method according to claim 14, wherein at least one item of information related to the treatment data is at least one of being displayed to a user via a user interface, or being provided to at least one of a treatment unit or a simulation system.

16. The monitoring system according to claim 7, further comprising at least one of:
at least one light source designated for illuminating at least a portion of the at least one substance;
an optical probe designated for measuring optical signals related to the at least one substance;
a first connection between the optical probe and the optical spectrometer designated for guiding the measured optical signals to the optical spectrometer;
a second connection between the at least one light source and the optical probe designated for guiding light to the optical probe; and
a data transfer unit designated for connection between the optical spectrometer and the second server.

17. The monitoring system according to claim 16, wherein the second server, the optical spectrometer and the data transfer unit are integrated into a single unit.

18. The monitoring system according to claim 16, wherein at least one of the first connection and the second connection comprises an optical waveguide.

19. The monitoring system according to claim 16, wherein the optical probe comprises a setup for at least one of a transmittance geometry, a transflexion geometry, or a reflection geometry.

* * * * *